US012131527B2

(12) United States Patent
Lal et al.

(10) Patent No.: US 12,131,527 B2
(45) Date of Patent: Oct. 29, 2024

(54) ULTRASONIC COMPUTATION HARDWARE FOR CONVOLUTIONAL NEURAL NETWORK COMPUTING AND OTHER COMPUTATION APPLICATIONS

(71) Applicant: Cornell University, Ithaca, NY (US)

(72) Inventors: Amit Lal, Ithaca, NY (US); Yutong Liu, Ithaca, NY (US); Juneho Hwang, Ithaca, NY (US); Justin Kuo, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 18/282,141

(22) PCT Filed: Apr. 20, 2022

(86) PCT No.: PCT/US2022/025586
§ 371 (c)(1),
(2) Date: Sep. 14, 2023

(87) PCT Pub. No.: WO2022/245462
PCT Pub. Date: Nov. 24, 2022

(65) Prior Publication Data
US 2024/0265694 A1 Aug. 8, 2024

Related U.S. Application Data

(60) Provisional application No. 63/177,220, filed on Apr. 20, 2021.

(51) Int. Cl.
*G06V 10/94* (2022.01)
*G06V 10/82* (2022.01)

(52) U.S. Cl.
CPC ............ *G06V 10/955* (2022.01); *G06V 10/82* (2022.01)

(58) Field of Classification Search
None
See application file for complete search history.

(56) References Cited

U.S. PATENT DOCUMENTS

| 4,591,241 A | 5/1986 | Huignard |
| 4,692,722 A | 9/1987 | Reichel et al. |

(Continued)

FOREIGN PATENT DOCUMENTS

WO WO-2019226881 A1 * 11/2019 ............. G01H 11/08

OTHER PUBLICATIONS

M. Abdelmejeed et al., "Monolithic 180nm CMOS Controlled GHz Ultrasonic Impedance Sensing and Imaging," IEEE International Electron Devices Meeting (IEDM), Dec. 2019, pp. 807-810.

(Continued)

*Primary Examiner* — Leon Flores
(74) *Attorney, Agent, or Firm* — Ryan, Mason & Lewis, LLP

(57) ABSTRACT

An ultrasonic computation apparatus includes first and second ultrasonic transducer arrays arranged on opposing ends thereof, and further comprises first and second ultrasonic propagation regions arranged between the first and second ultrasonic transducer arrays and proximate respective ones of the first and second ultrasonic transducer arrays, and an intermediate computational structure arranged between the first and second ultrasonic propagation regions. Respective first and second input signals applied to respective ones of the first and second ultrasonic transducer arrays cause propagation of corresponding ultrasonic waves through the respective first and second ultrasonic propagation regions towards the intermediate computational structure. The intermediate computational structure is configured to receive the propagating ultrasonic waves from the respective first and second ultrasonic propagation regions and to generate from (Continued)

ULTRASONIC COMPUTATION ENGINE the received propagating ultrasonic waves an additional signal that is a function of the first and second signals.

20 Claims, 12 Drawing Sheets

(56) References Cited

U.S. PATENT DOCUMENTS

| | | | |
|---|---|---|---|
| 4,852,575 | A | 8/1989 | Nikoonahad |
| 8,277,380 | B2 | 10/2012 | Daft et al. |
| 8,310,129 | B2 | 11/2012 | Defay et al. |
| 8,575,820 | B2 | 11/2013 | Shirakawa et al. |
| 9,106,199 | B2 | 8/2015 | Deguet et al. |
| 11,333,548 | B2 | 5/2022 | Lal |
| 2004/0189425 | A1 | 9/2004 | Iwashita et al. |
| 2012/0172721 | A1 | 7/2012 | Curra et al. |
| 2015/0165479 | A1 | 6/2015 | Lasiter et al. |
| 2018/0260950 | A1 | 9/2018 | Samset et al. |
| 2020/0055085 | A1 | 2/2020 | Taffler |
| 2021/0255032 | A1 | 8/2021 | Lal |

OTHER PUBLICATIONS

M. Abdelmejeed et al., "AlN GHz Ultrasonic Pulse Diffraction Based Transmit-Receive Oscillator with 1 PPM Stability," 19th International Conference on Solid-State Sensors, Actuators and Microsystems (Transducers), Jun. 2017, pp. 106-109.
J. Hoople et al., "Chip-cale Reconfigurable Phased-Array Sonic Communication," IEEE International Ultrasonics Symposium, Sep. 2014, pp. 479-482.
J. Hoople et al., "Chip-Scale Sonic Communication Using AlN Transducers," IEEE International Ultrasonics Symposium, Jul. 2013, pp. 1934-1937.
J. Hwang et al., "Planar Lens for GHz Fourier Ultrasonics," IEEE International Ultrasonics Symposium, Sep. 2020, 4 pages.
D.-G. Sun et al., "Butterfly Interconnection Networks and Their Applications in Information Processing and Optical Computing: Applications in Fast-Fourier-Transform-Based Optical Information Processing," Applied Optics, vol. 32, No1. 35, Dec. 10, 1993, pp. 7184-7193.
Y. Liu et al., "Optical Measurement of Ultrasonic Fourier Transforms," IEEE International Ultrasonics Symposium, Oct. 2018, 4 pages.
M. Abdelmejeed et al., "Thermal Wavefront Imaging Using GHz Ultrasonics," IEEE International Ultrasonics Symposium, Sep. 2017, 4 pages.
M. Abdelmejeed et al., "A CMOS Compatible GHz Ultrasonic Pulse Phase Shift Based Temperature Sensor," IEEE Micro Electro Mechanical Systems, Jan. 2018, pp. 1108-1111.
T. Lu et al., "Two-Dimensional Programmable Optical Neural Network," Applied Optics, vol. 28, No. 22, Nov. 15, 1989, pp. 4908-4913.
C. Bao et al., "Temperature Tracking: Toward Robust Run-Time Detection of Hardware Trojans," IEEE Transactions on Computer-Aided Design of Integrated Circuits and Systems, vol. 34, No. 10, Oct. 2015, pp. 1577-1585.
C. R. Aguayo et al., "Power Fingerprinting in SDR Integrity Assessment for Security and Regulatory Compliance," Analog Integrated Circuits and Signal Processing, vol. 69, Sep. 29, 2011, pp. 307-327.
J. H. Reed et al., "Enhancing Smart Grid Cyber Security using Power Fingerprinting," Future of Instrumentation International Workshop Proceedings, Oct. 2012, 3 pages.
P.-C. Chen et al., "A Silicon/Plastic Hybrid Tissue Multimodal Assay Tweezer with Integrated Polysilicon Strain Gauge Displacement Sensor," IEEE 29th International Conference on Micro-Electro-Mechanical Systems, Jan. 2016, pp. 333-336.

T. St. Bernard et al., "Silicon Horn Transducer Based Ultrasonically Enhanced Nerve Firing," IEEE International Ultrasonics Symposium, Oct. 2015, 4 pages.
J. Hoople et al., "Optimized Response of AlN Stack for Chipscale GHz Ultrasonics," IEEE International Ultrasonics Symposium, Oct. 2015, 4 pages.
J. Hoople et al., "Chipscale GHz Ultrasonic Channels for Fingerprint Scanning," IEEE International Ultrasonics Symposium, Oct. 2015, 4 pages.
J. Kuo et al., "Towards a CMOS Compatible Ultrasonic Delay Line Memory," IEEE International Ultrasonics Symposium, Oct. 2015, 4 pages.
J. Kuo et al., "Towards Ultrasonic Through-Silicon Vias (UTSV)," IEEE International Ultrasonics Symposium, Sep. 2014, 4 pages.
E. Gantsog et al., "A 12.46 µW Baseband Timing Circuitry for Synchronization and Duty-Cycling of Scalable Wireless Mesh Networks in IoT," IEEE Radio Frequency Integrated Circuits Symposium, Jun. 2018, pp. 328-331.
M. Abdelmejeed et al., "Towards Digitally Controlled Ultrasonic IQ Modulator," IEEE International Ultrasonics Symposium, Oct. 2019, pp. 1967-1970.
Y. Liu et al., "Towards a CMOS Integrated Optically Controlled AlN Transducer," IEEE International Ultrasonics Symposium, Oct. 2019, pp. 1996-1999.
A. Ravi et al., "Acousto-Optic Modulation of Water in a Microfluidic Channel Using Planar Fresnel Type GHz Ultrasonic Transducer," IEEE International Ultrasonics Symposium, Oct. 2019, pp. 1025-1028.
J. Kuo et al., "64-Pixel Solid State CMOS Compatible Ultrasonic Fingerprint Reader," IEEE 30th International Conference on Micro Electro Mechanical Systems, Jan. 2017, pp. 9-12.
R. K. Dokania et al., "A Low Power Impulse Radio Design for Body-Area-Networks," IEEE Transactions on Circuits and Systems I: Regular Papers, vol. 58, No. 7, Jul. 2011, pp. 1458-1469.
X. Y. Wang et al., "A Crystal-Less Self-Synchronized Bit-Level Duty-Cycled IR-UWB Transceiver System," IEEE Transactions on Circuits and Systems I: Regular Papers, vol. 60, No. 9, Sep. 2013, pp. 2488-2501.
J. Fagerholm et al., "Computer-Generated Fourier-Transform Holograms For Optical Computing," Holographic Optics II: Principles and Applications, Oct. 1989, Abstract Only.
International Search Report of PCT/US2022/025586, dated Nov. 22, 2022, 15 pages.
C. E. Leiserson et al., "Can Software Performance Engineering Save Us From the End of Moore's Law?" https://spectrum.ieee.org/software-engineering-can-save-us-from-the-end-of-moores-law, Jun. 4, 2020, 6 pages.
H. Esmaeilzadeh et al., "Dark Silicon and the End of Multicore Scaling," Proceedings of the 38th International Symposium on Computer Architecture, Jun. 2011, 12 pages.
Silterra, "Piezoelectric Bulk Acoustic Wave MEMS Process Platform (BAW)," https://www.silterra.com/piezoelectric-bulk-acoustic-wave-mems-process-platform-baw, Accessed May 22, 2023, 1 page.
P. S. Balasubramanian et al., "GHz Ultrasonic Chip-Scale Device Induces Ion Channel Stimulation in Human Neural Cells," Scientific Reports, vol. 10, No. 1, Dec. 20202, 20 pages.
S. Chakradhar et al., "A Dynamically Configurable Coprocessor for Convolutional Neural Networks," 37th International Symposium on Computer Architecture, Jun. 2010, pp. 247-257.
Y.-H. Chen et al., "Eyeriss: A Spatial Architecture for Energy-Efficient Dataflow for Convolutional Neural Networks," 43rd Annual International Symposium on Computer Architecture, Jun. 2016, 13 pages.
S. Marsland, "Machine Learning: An Algorithmic Perspective," Chapman & Hall/CRC Machine Learning & Pattern Recognition Series, 2015, 452 pages.
A. A. Minnekhanov et al., "Parylene Based Memristive Devices with Multilevel Resistive Switching for Neuromorphic Applications," Scientific Report, vol. 9, No. 1, Jul. 25, 2019, 9 pages.
F. Merrikh-Bayat et al., "High-Performance Mixed-Signal Neurocomputing with Nanoscale Floating-Gate Memory Cell Arrays," IEEE Transactions Neural Networks and Learning Systems, vol. 29, No. 10, Oct. 2018, 9 pages.

(56) References Cited

OTHER PUBLICATIONS

A. J. Macfaden et al., "An Optical Fourier Transform Coprocessor with Direct Phase Determination," Scientific Reports, vol. 7, Oct. 20, 2017, 8 pages.
N. Zheludev et al., "Reconfigurable Nanomechanical Photonic Metamaterials," Nature Nanotechnology, Jan. 2016, 14 pages.
X. Lin et al., "All-Optical Machine Learning Using Diffractive Deep Neural Networks," Science, Sep. 2018, 20 pages.
C. S. Weaver et al., "A Technique for Optically Convolving Two Functions," Applied Optics, vol. 5, No. 7, Jul. 1966, pp. 1248-1249.
D. Liao et al., "All-Optical Diffractive Neural Networked Terahertz Hologram," Optics Letters, vol. 46, No. 10, May 15, 2020, 4 pages.
M. Miscuglio et al., "Massively Parallel Amplitude-Only Fourier Neural Network," Optica, vol. 7, No. 12, Dec. 2020, p. 1812-1819.
K. Xiao et al., "Hardware Trojans: Lessons Learned after One Decade of Research," ACM Transactions on Design Automation of Electronic Systems, vol. 22, No. 1, Article 6, May 2016, 23 pages.
A. N. Nowroz et al., "Novel Techniques for High-Sensitivity Hardware Trojan Detection Using Thermal and Power Maps," IEEE Transactions on Computer-Aided Design of Integrated Circuits and Systems, vol. 33, No. 12, Dec. 2014, pp. 1792-1805.
C. Rooney et al., "Creation and Detection of Hardware Trojans Using Non-Invasive Off-The-Shelf Technologies," Electronics, vol. 7, No. 124, Jul. 22, 2018, 21 pages.
L. Pyrgas et al., "Thermal Sensor Based Hardware Trojan Detection in FPGAs," Euromicro Conference on Digital System Design (DSD), Aug. 2017, 6 pages.
Y. Liu et al., "On Code Execution Tracking via Power Side-Channel," Proceedings of the 2016 ACM SIGSAC Conference on Computer and Communications Security, Oct. 2016, pp. 1019-1031.
J. M. Hernandez et al., "Towards a Cyber Defense Framework for SCADA Systems Based on Power Consumption Monitoring," Proceedings of the 50th Hawaii International Conference on System Sciences, Jan. 4, 2017, 7 pages.
Y. Han et al., "Watch Me, but Don't Touch Me! Contactless Control Flow Monitoring via Electromagnetic Emanations," Proceedings of the 2017 ACM SIGSAC Conference on Computer and Communications Security, Oct. 2017, pp. 1095-1108.
A. Nazari et al., "EDDIE: EM-Based Detection of Deviations in Program Execution," 44th Annual International Symposium on Computer Architecture, Jun. 2017, pp. 333-346.
N. Sehatbakhsh et al., "Syndrome: Spectral Analysis for Anomaly Detection on Medical IoT and Embedded Devices," IEEE International Symposium on Hardware Oriented Security and Trust, May 2018, 8 pages.
R. H. Olsson, III et al., "Post-CMOS-Compatible Aluminum Nitride Resonant MEMS Accelerometers," Journal of Microelectromechanical Systems, vol. 18, No. 3, Jun. 2009, pp. 671-678.
X. Y. Wang et al., "A Self-Synchronized, Crystal-Less, 86µW, Dual-Band Impulse Radio for Ad-Hoc Wireless Networks," IEEE Radio Frequency Integrated Circuits Symposium, Jun. 2011, 4 pages.
H. Yuksel et al., "An FDD/FD Capable, Single Antenna RF Front End from 800MHz to 1.2GHz w/ Baseband Harmonic Predistortion," IEEE Radio Frequency Integrated Circuits Symposium, Jun. 2018, pp. 120-123.
H. Yuksel et al., "A Wideband Fully Integrated Software-Defined Transceiver for FDD and TDD Operation," IEEE Journal of Solid-State Circuits, vol. 52, No. 5, May 2017, 15 pages.
Y. Zhang et al., "Precision Gating: Improving Neural Network Efficiency with Dynamic Dual-Precision Activations," International Conference on Learning Representations, Apr. 2020, 13 pages.
W. Hua et al., "Channel Gating Neural Networks," 33rd Conference on Neural Information Processing Systems, Dec. 2019, 11 pages.
R. Zhao et al., "Improving Neural Network Quantization without Retraining using Outlier Channel Splitting," 36th International Conference on Machine Learning, Jun. 2019, 10 pages.
R. Zhao et al., "Building Efficient Deep Neural Networks with Unitary Group Convolutions," IEEE/CVF Conference on Computer Vision and Pattern Recognition (CVPR), Jun. 2019, pp. 11303-11312.
Y. S. Abu-Mostafa et al., "Optical Neural Computers," Scientific American, vol. 256, Mar. 1987, pp. 88-95.
H. Pratt et al., "FCNN: Fourier Convolutional Neural Networks," ECML/PKDD, Sep. 17, 2017. 16 pages.
D. Psaltis, "Coherent Optical Information Systems," Science, vol. 298, Nov. 15, 2002, pp. 1359-1363.
J. H. Reif et al., "Efficient Parallel Algorithms for Optical Computing with The Discrete Fourier Transform (DFT) Primitive," Applied Optics, vol. 36, Oct. 10, 1997, pp. 7327-7340.
T. J. Naughton, "A Model of Computation for Fourier Optical Processors," Optics in Computing, Jun. 2000, 12 pages.

* cited by examiner

ULTRASONIC COMPUTATION HARDWARE FOR CONVOLUTIONAL NEURAL NETWORK COMPUTING AND OTHER COMPUTATION APPLICATIONS

RELATED APPLICATION

The present application claims priority to U.S. Provisional Patent Application Ser. No. 63/177,220, filed Apr. 20, 2021, which is incorporated by reference herein in its entirety.

STATEMENT OF GOVERNMENT SUPPORT

This invention was made with U.S. government support under Grant No. HR00117298430001 of the Defense Advanced Research Projects Agency (DARPA)—Defense Sciences Office (DSO). The U.S. government has certain rights in the invention.

FIELD

The field relates generally to ultrasonic devices, and more particularly to ultrasonic computation hardware, which can be utilized to perform computations in information processing systems.

BACKGROUND

As the amounts of data created in a wide variety of different applications continue to grow exponentially, there is need to process such data more efficiently, such as with enhanced processing speed but with lower power consumption. For example, cameras with ever-increasing pixel counts and continuous sensor data collection have created vast amounts of visual data, which needs to be processed quickly to be useful in applications such as driverless cars, drones and autonomous robots. However, conventional circuit-based approaches are running up against the limits of Moore's law as well as associated thermal limitations of integrated circuits. Accordingly, improved computational arrangements are needed to more efficiently process data in these and numerous other contexts.

SUMMARY

Illustrative embodiments disclosed herein provide ultrasonic computation hardware that can, for example, perform highly efficient convolution operations in neural network computing applications, such as those involving driverless cars, drones and autonomous robots. Such ultrasonic computation hardware can similarly provide efficient computation in a wide variety of other computation applications.

In one embodiment, an ultrasonic computation apparatus includes first and second ultrasonic transducer arrays arranged on opposing ends thereof, and further comprises first and second ultrasonic propagation regions arranged between the first and second ultrasonic transducer arrays and proximate respective ones of the first and second ultrasonic transducer arrays, and an intermediate computational structure arranged between the first and second ultrasonic propagation regions. Respective first and second input signals applied to respective ones of the first and second ultrasonic transducer arrays cause propagation of corresponding ultrasonic waves through the respective first and second ultrasonic propagation regions towards the intermediate computational structure. The intermediate computational structure is configured to receive the propagating ultrasonic waves from the respective first and second ultrasonic propagation regions and to generate from the received propagating ultrasonic waves an additional signal that is a function of the first and second signals.

In some embodiments, the ultrasonic computation apparatus is configured to perform high-efficiency convolutions of an input image with kernel images in a convolutional neural network (CNN), deep neural network (DNN) or other type of neural network or machine learning system. Under conventional circuit-based approaches, the mathematical complexity of such convolution operations is very high and can limit the speed at which the CNN or DNN can perform image recognition.

Some embodiments disclosed herein advantageously provide an ultrasonic computation apparatus configured to generate respective Fourier transforms of the input image and a given one of the kernels, to multiply the resulting Fourier transforms in the analog domain, and to perform an inverse Fourier transform to obtain the convolution of the input image and the given one of the kernel images. Such arrangements substantially reduce the complexity of the convolution operations, allowing the operations to be performed at high speed and with low power consumption, thereby significantly enhancing the overall performance of the CNN or DNN in its image processing tasks.

As noted above, a wide variety of other types of computations can be efficiently performed in other applications using ultrasonic computation hardware as disclosed herein. Accordingly, it should be understood that the foregoing arrangements are only examples, and numerous alternative arrangements are possible.

These and other illustrative embodiments include but are not limited to systems, methods, apparatus, processing devices, integrated circuits, and computer program products comprising processor-readable storage media having software program code embodied therein.

DETAILED DESCRIPTION

Figure 1:
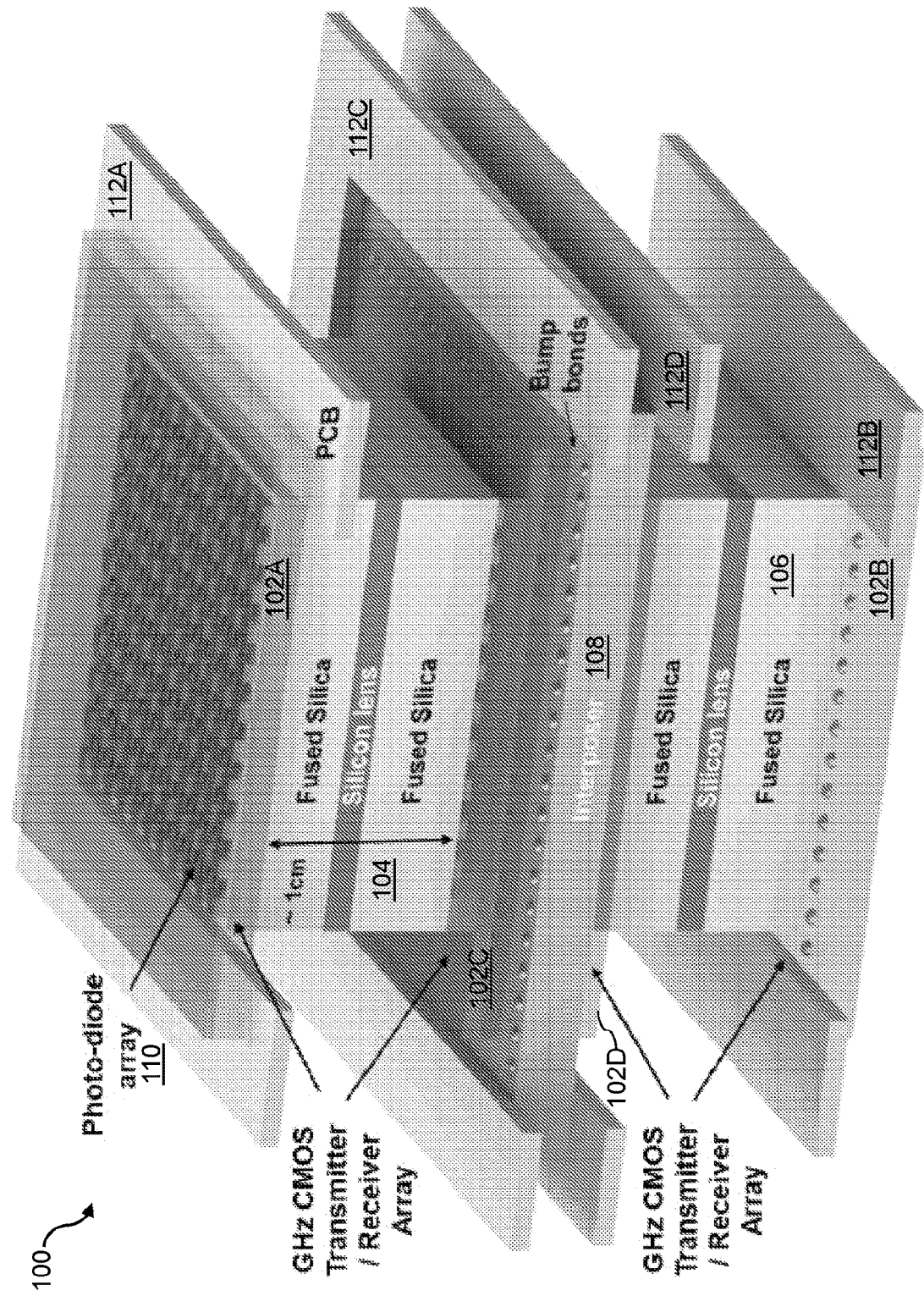
FIG. 1 shows an ultrasonic computation engine in an illustrative embodiment.

Illustrative embodiments include ultrasonic computation engines and other types of ultrasonic computation hardware. Such ultrasonic computation hardware in some embodiments can be implemented, for example, in information processing systems comprising one or more processing platforms each having at least one computer, server or other processing device. For example, a given such processing platform implementing a neural network or other type of machine learning system can incorporate one or more ultrasonic computation engines that are utilized by the machine learning system to perform various types of computations, such as convolutions of input images with kernel images in a CNN, DNN or other type of neural network or machine learning system. A number of examples of such systems will be described in detail herein. It should be understood, however, that the disclosed embodiments are more generally applicable to a wide variety of other computation contexts, illustratively involving other arrangements of ultrasonic computation hardware and associated processing devices, memories and additional or alternative components. Accordingly, the term "information processing system" as used herein is intended to be broadly construed so as to encompass these and other arrangements.

Some illustrative embodiments provide methods and systems for a computing architecture configured to perform neural network operations.

There are significant problems with and limitations in current neural networks, which restrict their performance and functionality. For example, a common feature of CNNs is to perform the convolution of a set of kernel images with an input image. The convolutions are then weighted to estimate if the image contains the feature image. The mathematical complexity of the convolution operation is very high and can limit the speed at which image recognition can occur. It is also known that the Fourier transform of a convolution of two functions is the product of the Fourier transforms of the two functions.

Some embodiments disclosed herein recognize that there are potential problems, limitations, and/or disadvantages with conventional neural networks and associated computational arrangements as discussed herein. Various embodiments may be advantageous in that they may solve or reduce one or more of the potential problems, limitations, and/or disadvantages discussed herein.

For example, some embodiments provide ultrasonic computation hardware that can provide significantly enhanced computational efficiency in applications such as driverless cars, drones, and autonomous robots. In these and other applications, cameras and other types of sensors transmit data to an edge device of an information processing system configured in accordance with a core-edge architecture.

Some embodiments disclosed herein can provide orders of magnitude efficiency gains for performing certain types of computations in these and numerous other applications. For example, illustrative embodiments of the present disclosure can perform real-time convolutions of an input image with a kernel image in a highly efficient manner, leading to substantial improvement in image recognition speeds. Additional improvements in terms of power consumption as well as weight and cost are also provided in performing such image-related computations. Moreover, illustrative embodiments can be readily integrated with photodiode arrays or other types of image sensor arrays of optical imagers.

Illustrative embodiments disclosed herein therefore overcome significant drawbacks of conventional arrangements. Although these illustrative embodiments are described in conjunction with particular applications, the disclosed techniques can be adapted in a straightforward manner to other contexts and use cases.

In some embodiments, the ultrasonic computation hardware generates and detects GigaHertz (GHz) ultrasonic waves in silicon substrates. For example, thin-film piezoelectric film based transducers are illustratively formed on top of CMOS wafers, and the embedded CMOS is used to drive and sense strain waves. An array of two-dimensional (2D) piezoelectric pixels can launch waves into the bulk silicon to produce a Fourier transform of the input phase and magnitude of voltages applied at the input frame. The CMOS integration utilized in some embodiments allows very low energy and fast operation. The transducers illustratively include piezoelectric ultrasonic transducers formed using an Aluminum Nitride (AlN) process on a CMOS substrate, although other types of transducers can be used.

FIG. 1 shows an ultrasonic computation engine 100 in an illustrative embodiment. The ultrasonic computation engine 100 is an example of what is more generally referred to herein as "ultrasonic computation hardware" or an "ultrasonic computation apparatus." The particular configuration and functionality of the ultrasonic computation engine 100 is presented by way of illustrative example only, and should not be construed as limiting in any way.

The ultrasonic computation engine 100 comprises GHz CMOS transmitter/receiver arrays 102A, 102B, 102C and 102D, also referred to herein as illustrative examples of ultrasonic transducer arrays. Different ones of the transmitter/receiver arrays 102 may have different configurations. For example, a given such array may be transmit only, receive only, or configured to both transmit and receive. Accordingly, the term "transmitter/receiver" as used herein is intended to be construed as transmitter and/or receiver. First and second ones of these ultrasonic transducer arrays 102A and 102B are arranged on opposing ends of the ultrasonic computation engine 100. The ultrasonic computation engine 100 further comprises first and second ultrasonic propagation regions 104 and 106 arranged between the first and second ultrasonic transducer arrays 102A and 102B and proximate respective ones of the first and second ultrasonic transducer arrays 102A and 102B, and an intermediate computational structure arranged between the first and second ultrasonic propagation regions 104 and 106.

The term "proximate" as used herein is intended to be broadly construed, so as to encompass, for example, arrangements in which a transducer array is adjacent to an ultrasonic propagation region or otherwise arranged relative to an ultrasonic propagation region in a manner that permits the transducer array to transmit and/or receive ultrasonic waves from the ultrasonic propagation region.

The intermediate computational structure in this embodiment more particularly comprises ultrasonic transducer arrays 102C and 102D and an interposer layer 108 arranged between the ultrasonic transducer arrays 102C and 102D. At least the first ultrasonic transducer array 102A of the first and second ultrasonic transducer arrays 102A and 102B has a photodiode array 110 formed thereon as illustrated in the figure. The ultrasonic transducer arrays 102A, 102B, 102C and 102D are supported at least in part by respective printed circuit boards (PCBs) 112A, 112B, 112C and 112D within the ultrasonic computation engine 100. As indicated above, this particular arrangement of components of ultrasonic computation engine 100 is exemplary only, and can be varied in other embodiments.

In the ultrasonic computation engine 100, respective first and second input signals applied to respective ones of the first and second ultrasonic transducer arrays 102A and 102B cause propagation of corresponding ultrasonic waves through the respective first and second ultrasonic propagation regions 104 and 106 towards the intermediate computational structure. The intermediate computational structure is configured to receive the propagating ultrasonic waves from the respective first and second ultrasonic propagation regions 104 and 106 via the respective ultrasonic transducer arrays 102C and 102D and to generate from the received propagating ultrasonic waves an additional signal that is a function of the first and second signals.

For example, the intermediate computational structure in the ultrasonic computation engine 100 is illustratively configured to generate the additional signal at least in part as a product of transformed versions of the respective first and second signals as represented by the corresponding received propagating ultrasonic waves.

More particularly, the first ultrasonic transducer array 102A and the first ultrasonic propagation region 104 are configured such that the propagation of ultrasonic waves corresponding to the first signal through the first ultrasonic propagation region 104 causes a Fourier transform of the first signal to be received at a first side of the intermediate computational structure proximate the first ultrasonic propagation region 104.

Similarly, the second ultrasonic transducer array 102B and the second ultrasonic propagation region 106 are configured such that the propagation of ultrasonic waves corresponding to the second signal through the second ultrasonic propagation region 106 causes a Fourier transform of the second signal to be received at a second side of the intermediate computational structure proximate the second ultrasonic propagation region 106.

The propagation regions 104 and 106 each comprise an ultrasonic lens, illustratively formed in silicon, that results in production of an equivalent Fourier transform of the ultrasonic waves at the corresponding transmitter/receiver array 102C or 102D. The thicknesses of the two sides of the propagation regions are illustratively chosen to be the focal length of the lens. The transit time of the wavefront from the transmitter array to the receiver array can be estimated as $t_{transit} = 2F/c_{sound}$ where F is the focal length of the lens and $c_{sound}$ is the speed of sound in the propagation regions. The focal length is typically proportional to the aperture size A of the ultrasonic transducer array by the $f_{stop}$ number. If N pixels can fit in the aperture, and each pixel occupies space proportional to the ultrasonic wavelength $(\lambda = c_{sound}/f)$, where f is the ultrasonic frequency, an N×N pixel Fourier transform can be obtained in a time $$t_{compute} \sim t_{transit} \sim \frac{N\lambda}{c_{sound}} = N * T.$$

Here T is the period of the ultrasonic frequency. Hence, an N×N pixel Fourier transform can be obtained in illustrative embodiments in a time proportional to the number of pixels N. In contrast, digital domain Fourier transforms can require a number of computational operations given by $O(N^2 \log N)$.

The analog computation of a Fourier transform as disclosed herein can therefore be performed at high speeds, particularly when N is large, and the ultrasonic frequencies are comparable to the clock speeds being used in computing systems. As has been evident in microcontroller development over the last decade, clock frequencies have saturated to a few GHz, owing to the excessive power consumption, also known as the power-wall. An ultrasonic Fourier transform of the type disclosed herein, if the ultrasonic frequency is in the Ghz range, can achieve small pixels owing to small wavelengths, and can provide speed gains over digital computation. The operation at higher frequency also enables reduction of the overall length of the ultrasonic travel distance, enabling small mm-cm scale systems that be integrated onto common PCB assemblies.

In some embodiments, the ultrasonic frequencies utilized in the ultrasonic computation engine 100 are greater than about 1 GHz, although other ultrasonic frequencies can be used in other embodiments, and the term "ultrasonic" as used herein is therefore intended to be broadly construed. For example, in other embodiments, ultrasonic frequencies in a range of about 0.5 GHz to 5 GHz can be used, although this is again just an example and should not be construed as limiting in any way.

As indicated above, the lenses within the respective ultrasonic propagation regions 104 and 106 are illustratively formed in silicon. For example, the lenses can be made in silicon at least in part by filling silicon cavities with silicon dioxide ($SiO_2$), although other materials and techniques can be used. As another example, the lenses can be made in fused quartz, by etching it in pillars, and filling with silicon.

The ultrasonic propagation regions 104 and 106 are illustratively also formed at least in part using silicon, and may comprise, for example, fused silica, as indicated in the illustrative embodiment of FIG. 1. Other low-loss materials such as, for example, sapphire and fused quartz, can additionally or alternatively be used. It should also be noted, in some embodiments, a particular substrate may be anisotropic, such that ultrasonic waves propagate at different speeds in different directions, and transmission compensation may be used in embodiments that utilize such substrates, as will be appreciated by those skilled in the art.

It is assumed in the FIG. 1 embodiment that at least the first ultrasonic transducer array 102A comprises a transmit/receive ultrasonic transducer array that is illustratively configured both to transmit ultrasonic waves to its corresponding ultrasonic propagation region 104, and to receive ultrasonic waves from its corresponding ultrasonic propagation region 104. In some embodiments, the second transducer 102B may be similarly configured. Alternatively, the second ultrasonic transducer array 102B may be configured to as transmit only, so as to only transmit ultrasonic waves to its corresponding ultrasonic propagation region 106.

The Fourier transforms of the respective first and second signals are illustratively received by the ultrasonic transducer arrays 102C and 102D at the respective first and second sides of the intermediate computational structure. The intermediate computational structure is illustratively configured to generate the additional signal as a product of the Fourier transforms of the respective first and second signals.

The generation of the additional signal in the intermediate computational structure illustratively causes propagation of additional ultrasonic waves through one of the first and second ultrasonic propagation regions 104 and 106 towards one of the first and second ultrasonic transducer arrays 102A and 102B such that a function of the additional signal is received at that one of the first and second ultrasonic transducer arrays 102A and 102B.

For example, the additional signal generated in the intermediate computational structure illustratively comprises a product of Fourier transforms of respective ones of the first and second signals and the function of the additional signal received at one of the first and second ultrasonic transducer arrays 102A and 102B comprises an inverse Fourier transform of the product of the Fourier transforms, where the inverse Fourier transform of the product of the Fourier transforms is a convolution of the first and second signals.

The ultrasonic computation engine 100 therefore computes the convolution of the first and second signals, in a highly efficient manner. Other types of computations can be performed using the ultrasonic computation engine in other embodiments.

In some embodiments, the first signal comprises an input image applied to the first ultrasonic transducer array 102A and the second signal comprises a kernel image applied to the second ultrasonic transducer array 102B. The first signal is illustrated received by the first ultrasonic transducer array 102A via the photodiode array 110. The photodiode array 110 is an example of what is more generally referred to herein as an "image sensor array." Other types of image sensor arrays can be used in other embodiments.

The kernel image is illustratively one of a plurality of kernel images of a CNN that comprises or otherwise utilizes the ultrasonic computation engine 100. The ultrasonic computation engine 100 in such an arrangement is configured to generate a plurality of convolutions of the input image with respective ones of the kernel images as respective convolution operations of the CNN. The convolutions in some embodiments are utilized as new images from which features are extracted, and which can then be used to train the CNN. Although CNNs are utilized in some embodiments herein, it is to be appreciated that the disclosed techniques are more generally applicable to performing high-efficiency computations in DNNs or other types of neural networks, as well as other types of machine learning systems.

As indicated above, the ultrasonic computation engine 100 performs convolutions using the property that the inverse Fourier transform of the product of Fourier transforms of the input and kernel images is the convolution of the input and kernel images. The ultrasonic computation engine 100 may be viewed as comprising stacked upper and lower block structures that produce Fourier transforms of the respective input image and kernel image, with multiplication of those Fourier transforms being performed in the intermediate computational structure in the analog domain using analog multipliers. The product is then transmitted back through the lower block structure to form the inverse Fourier transform of the product, which provides the convolution of the input image and the kernel image.

The time needed to compute the convolution in some embodiments is given approximately by $2L/c$, where L is the thickness of each of the upper and lower block structures, and c is the sound speed. This results in a time of about 4 microseconds (µs) for a large array, enabling convolutions to be performed at speeds on the order of megaframes per second. The volume of the ultrasonic computation engine 100 in some embodiments is on the order of about 2-3 cubic centimeters (cc), which is readily compatible with operation in cars, drones and robots, and in numerous other applications.

In some embodiments, the ultrasonic transducer arrays 102 illustratively comprise respective CMOS integrated piezoelectric ultrasonic transducer arrays, implemented in some embodiments as respective 2D AlN arrays. Typical transducer capacitances are in 10-100 femtoFarad (fF) range, and can be 1V CMOS compatible, and duty cycled for low power consumption operation. Phase can be easily measured using IQ mixers and row-column based ADC arrays.

In the ultrasonic computation engine 100, the first and second ultrasonic propagation regions 104 and 106 each include a first sub-region adjacent its corresponding one of the first and second ultrasonic transducer arrays 102A and 102B, a second sub-region adjacent the intermediate computational structure, and a lens arranged between the first and second sub-regions, as illustrated.

The first and second sub-regions in the FIG. 1 embodiment illustratively comprise fused silica, and the lens comprises a silicon lens, with the height of the corresponding first and second ultrasonic propagation regions 104 and 106 each being approximately 1 centimeter (cm), although other materials and dimensions may be used.

The various layers of the ultrasonic transducer arrays 102 are illustratively interconnected at least in part using flip-chip bonding arrangements with associated bond bumps, although alternative techniques can be used.

As will be described in more detail elsewhere herein, the intermediate computational structure illustratively comprises intermediate multiplication circuitry including a plurality of multiplier circuits, a plurality of in-phase and quadrature-phase mixer and converter circuits coupled to corresponding outputs of the multiplier circuits, and a plurality of product transmission circuits coupled to corresponding outputs of the mixer and converter circuits, arranged to facilitate the performance of the computations mentioned above. Additional or alternative circuitry can be incorporated into the intermediate computational structure in order to perform other types of computations.

Figure 2:
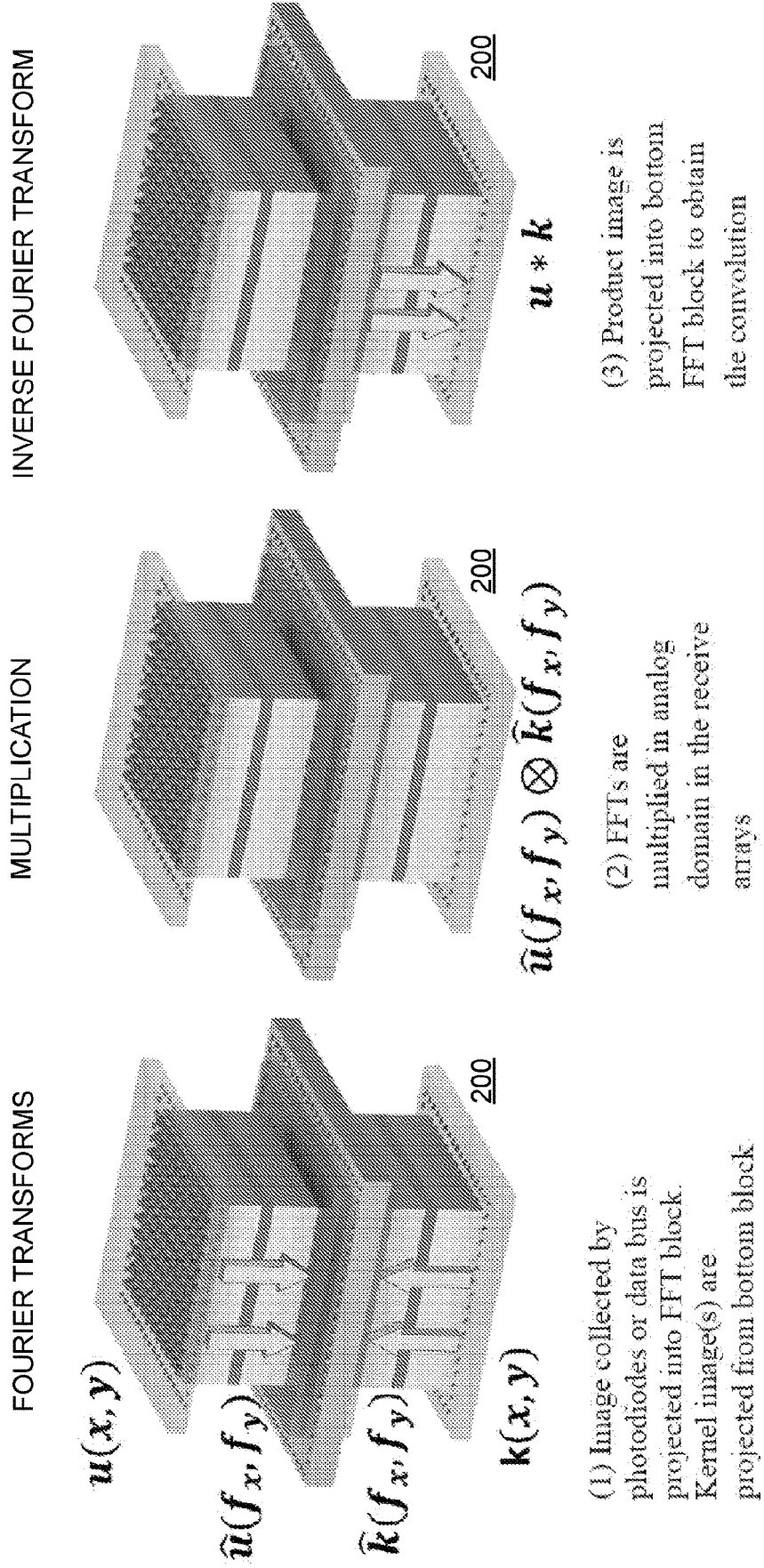
FIG. 2 illustrates the manner in which the ultrasonic computation engine of FIG. 1 performs a convolution of an input image with one or more kernel images in an illustrative embodiment.

FIG. 2 illustrates the manner in which an ultrasonic computation engine 200, similar to the ultrasonic computation engine 100 of FIG. 1, performs a convolution of an input image with one or more kernel images. The figure shows three different instances of the ultrasonic computation engine 200, arranged from left to right, with the left-most instance illustrating computation of the Fourier transforms of the respective input image and the kernel image by projection through the respective upper and lower ultrasonic propagation regions to the intermediate computational structure, the middle instance illustrating the multiplication of the two Fourier transforms in the intermediate computational structure, and the right-most instance illustrating the computation of the inverse Fourier transform of the product of the Fourier transforms of the input image and the kernel image by projection from the intermediate computational structure through the lower ultrasonic propagation region. PCBs similar to those utilized in the ultrasonic computation engine 100 are not shown in this figure for simplicity and clarity of illustration.

In the FIG. 2 embodiment, the first and second transducer layers at the top and bottom of the ultrasonic computation engine 200 comprise respective GHz ultrasonic CMOS layers configured to transmit the input image and the kernel image, respectively. The input image and the kernel image in this embodiment are more particularly denoted as $u(x,y)$ and k(x,y), respectively. Projection through the respective upper and lower ultrasonic propagation regions results in the transforming of the input image u(x,y) and the kernel image k(x,y) into their respective Fourier transforms, which are given by $\hat{u}(f_x,f_y)$ and $\hat{k}(f_x,f_y)$.

The intermediate computational structure computes the product of the two Fourier transforms $\hat{u}(f_x,f_y)$ and $\hat{k}(f_x,f_y)$, with the resulting product being given by $\hat{u}(f_x,f_y) \otimes \hat{k}(f_x,f_y)$. This product is projected through the lower ultrasonic propagation region to obtain at the second ultrasonic transducer array the convolution u*k.

The various steps (1), (2) and (3) associated with the computation of the convolution u*k in FIG. 2 may be further described as follows, with the Fourier transforms being more particularly referred to as fast Fourier transforms (FFTs) generated by respective top and bottom ultrasonic FFT blocks of the ultrasonic computation engine 200.

In step (1), the input image collected by a photodiode array or data bus is projected into the top ultrasonic FFT block and the kernel image collected in a similar manner is projected into the bottom ultrasonic FFT block, to generate the respective FFTs at the intermediate computational structure of the ultrasonic computation engine.

In step (2), the two FFTs are multiplied in the analog domain in the receive arrays of the intermediate computational structure.

In step (3), the resulting product image is projected into the bottom ultrasonic FFT block to obtain the convolution of the input image and the kernel image.

Figure 3:
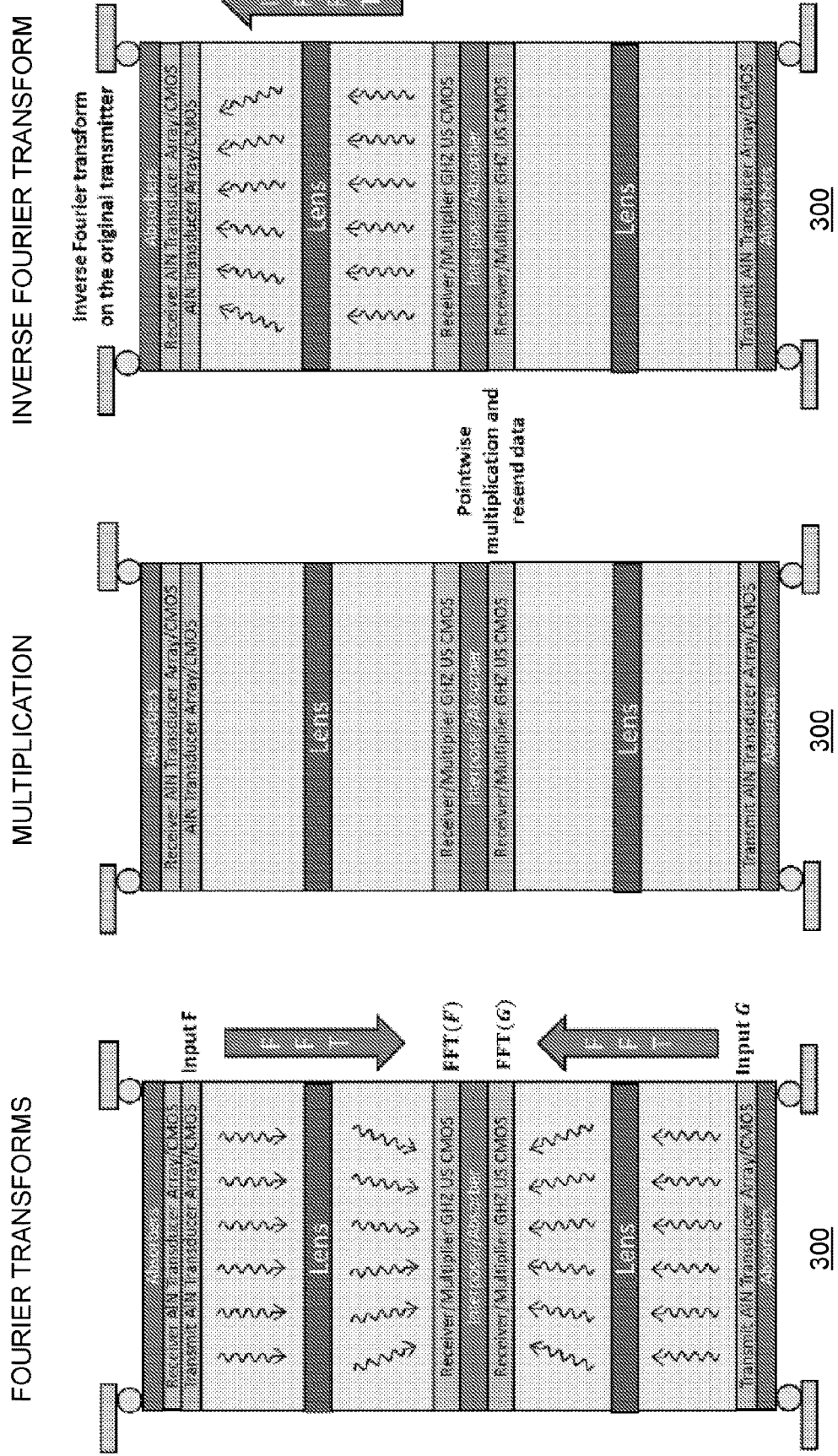
FIGS. 3 and 4 show additional examples of ultrasonic computation engines performing convolution operations in illustrative embodiments.
Figure 4:
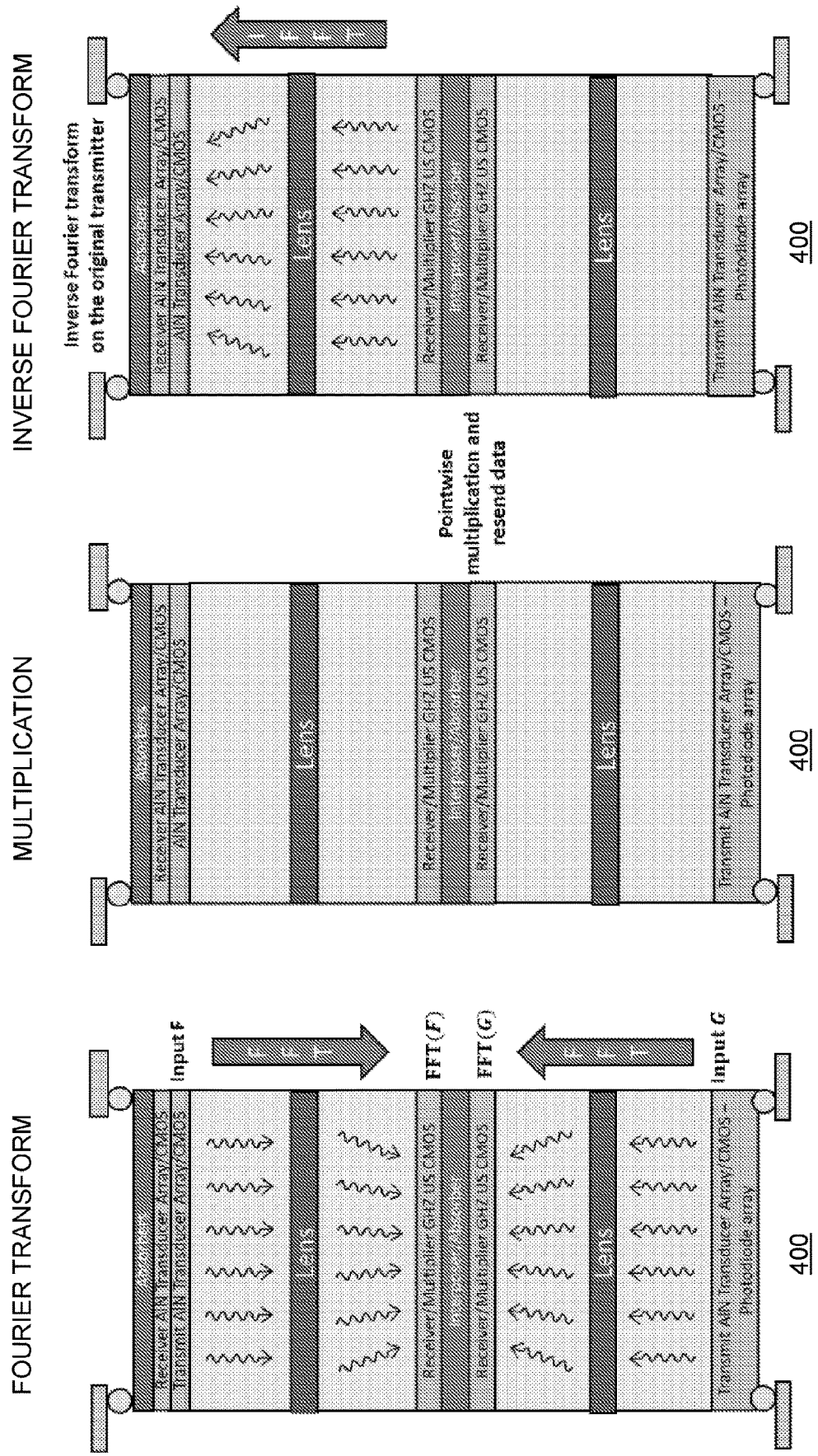

FIGS. 3 and 4 show additional examples of ultrasonic computation engines performing convolution operations in illustrative embodiments.

Referring now to FIG. 3, an ultrasonic computation engine 300, similar to the ultrasonic computation engines 100 and 200 previously described, performs a convolution of an input image with one or more kernel images. The figure shows three different instances of the ultrasonic computation engine 300, arranged from left to right, with the left-most instance illustrating computation of the Fourier transforms of the respective input image and the kernel image by projection through the respective upper and lower ultrasonic propagation regions to the intermediate computational structure, the middle instance illustrating the multiplication of the two Fourier transforms in the intermediate computational structure, and the right-most instance illustrating the computation of the inverse Fourier transform of the product of the Fourier transforms of the input image and the kernel image by projection from the intermediate computational structure through the lower ultrasonic propagation region. Again, PCBs similar to those utilized in the ultrasonic computation engine 100 are not shown in this figure for simplicity and clarity of illustration.

In the ultrasonic computation engine 300, a first ultrasonic transducer array at the top of the stacked structure comprises a transmit AlN ultrasonic transducer array implemented in CMOS combined with a receive AlN ultrasonic transducer array, also implemented in CMOS. The receive AlN ultrasonic transducer array can be formed, for example, by bonding a receive chip to the transmit chip implementing the transmit AlN ultrasonic transducer array. Alternatively, the receive AlN ultrasonic transducer array can be integrated with the transmit AlN ultrasonic transducer array into a single transmit/receive chip. A second ultrasonic transducer array at the bottom of the stacked structure comprises a transmit AlN ultrasonic transducer array implemented in CMOS. Both the first and second ultrasonic transducer arrays in this embodiment are associated with respective absorber layers as shown. The ultrasonic computation engine 300 further comprises the above-noted upper and lower ultrasonic propagation regions, each illustratively comprising a bulk ultrasonic transmission medium such as fused silica sub-regions and a silicon lens arranged as shown, and the above-noted intermediate computational structure which comprises a pair of GHz ultrasonic receiver/multiplier arrays also implemented in CMOS and an interposer/absorber layer between the receiver/multiplier arrays.

The ultrasonic computation engine 300 first computes FFTs of respective inputs F and G where F is illustratively an input image and G is a kernel image, as illustrated in the right-most instance in FIG. 3. The FFTs of F and G are multiplied in the analog domain in the intermediate computational structure, as shown in the middle instance, illustratively by pointwise multiplication utilizing multiplier circuits of a type described elsewhere herein.

Such analog multiplication advantageously enables very fast calculations, limited by the speed of the transistor level current and voltage changes. Direct analog computation avoids the need for analog-to-digital conversion (ADC) of the received signals, followed by digital multiplication, although such digital multiplication can be used in other embodiments. The use of analog components also enables miniaturization of each pixel to maximize the number of pixels for a given chip area.

The resulting product of the FFTs of F and G is then transmitted using an ultrasonic transducer array of the intermediate computational structure, via the upper ultrasonic propagation region, to the first ultrasonic transducer array at the top of the stacked structure, thereby performing an inverse FFT (IFFT) such that the convolution F*G is produced at the first ultrasonic transducer array. The product in other embodiments could instead be transmitted using an ultrasonic transducer array of the intermediate computational structure, via the lower ultrasonic propagation region, to the second ultrasonic transducer array at the bottom of the stacked structure.

FIG. 4 illustrates the operation of another ultrasonic computation engine 400, which is similar to that described above for the ultrasonic computation engine 300. However, in the ultrasonic computation engine 400, the second ultrasonic transducer array at the bottom of the stacked structure comprises a transmit AlN ultrasonic transducer array that is integrated in CMOS with a photodiode array. Such an arrangement allows an input image G to be directly captured by the photodiode array and then transmitted by the transmit AlN ultrasonic transducer array into the lower ultrasonic propagation region towards the intermediate computational structure. The photodiode collected photons generate a current which can be used to modulate the amplitude and phase of each AlN transducer.

A similar integration with a photodiode array could additionally or alternatively be implemented for the first ultrasonic transducer array at the top of the stacked structure, so as to allows an input image F to be directly captured by the photodiode array and then transmitted by the transmit AlN ultrasonic transducer array of the first ultrasonic transducer array into the upper ultrasonic propagation region towards the intermediate computational structure. The operation of the ultrasonic computation engine 400 is otherwise similar to that of the ultrasonic computation engine 300 as previously described.

Figure 5:
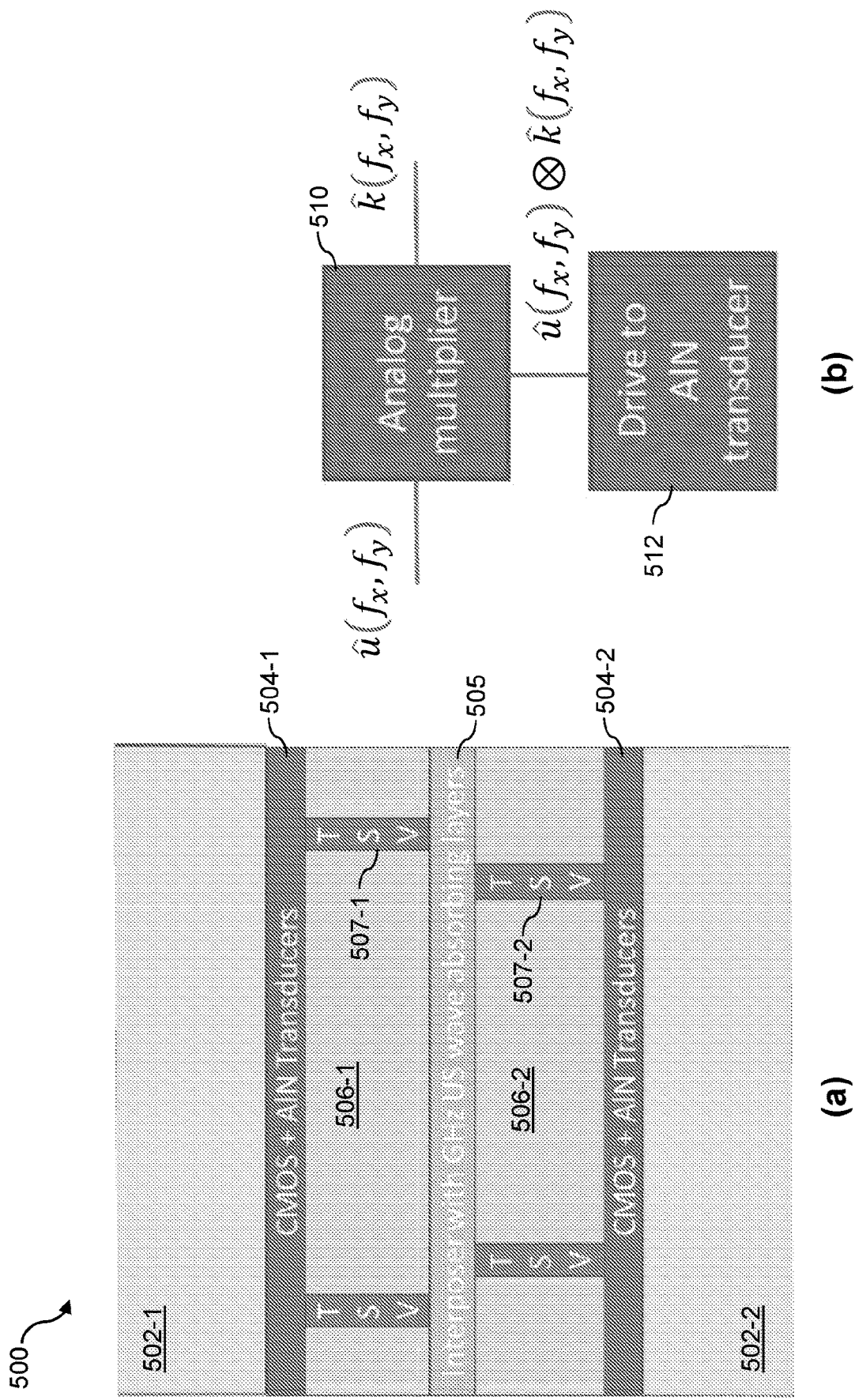
FIG. 5 in part (a) thereof shows a more detailed view of a portion of an ultrasonic computation engine and in part (b) thereof a corresponding block diagram, in illustrative embodiments.

FIG. 5 in part (a) thereof shows a more detailed view of a portion of an ultrasonic computation engine 500 and in part (b) thereof a corresponding block diagram, in illustrative embodiments.

Referring first to part (a), the portion of the ultrasonic computation engine 500 as illustratively comprises an intermediate computational structure arranged between respective upper and lower ultrasonic propagation regions 502-1 and 502-2. The intermediate computational structure comprises first and second receiver layers 504-1 and 504-2 arranged proximate respective ones of the upper and lower ultrasonic propagation regions 502-1 and 502-2, and an interposer layer 505 arranged between the first and second receiver layers 504-1 and 504-2. A plurality of through-silicon vias (TSVs), such as TSVs 507-1 and 507-2, are configured to connect the first and second receiver layers 504-1 and 504-2 through respective regions 506-1 and 506-2 to the interposer layer 505. In this embodiment, the receiver layers 504-1 and 504-2 comprise respective AlN ultrasonic transducer arrays implemented in CMOS, and the interposer layer 505 comprises an interposer GHz ultrasonic wave chip with absorbing layers. The interposer layer 505 may also be implemented in CMOS to facilitate interconnection with the receiver layers 504-1 and 504-2. The absorber layers of the interposer layer 505 illustratively comprise thin film absorbers, such as one or more layers of nickel and copper. The absorber layers prevent the ultrasonic waves propagating through the upper and lower ultrasonic propagation regions 502-1 and 502-2 from interfering with each other. In this embodiment, CMOS circuitry of the type described elsewhere herein is utilized to implement the multiplication of the two FFTs in the intermediate computational structure between the upper and lower ultrasonic propagation regions 502-1 and 502-2.

Referring now to part (b), the block diagram illustrates the computations performed in the intermediate computational structure in the portion of the ultrasonic computation engine 500 shown in part (a). As shown, an analog multiplier 510 of the interposer layer 505 receives the Fourier transforms, which are illustratively denoted $\hat{u}(f_x,f_y)$ and $\hat{k}(f_x,f_y)$, and multiplies the Fourier transforms to generate the product $\hat{u}(f_x,f_y) \otimes \hat{k}(f_x,f_y)$. The product is provided by the analog multiplier 510 to drive circuitry 512 of the interposer layer 505 for driving an AlN ultrasonic transducer array to propagate the product back through one of the upper or lower ultrasonic propagation regions 502-1 and 502-2 to compute the inverse Fourier transform of the product, which provides the convolution u*k.

The particular arrangement illustrated in FIG. 5 for the intermediate computational structure of the ultrasonic computation engine 500 can be similarly implemented in one or more of the other ultrasonic computation engines 100, 200, 300 and 400 as previously described. Additional or alternative structures and components can be utilized in implementing the intermediate computational structure in other embodiments.

The particular arrangements of ultrasonic computation engines illustrated in FIGS. 1 through 5 are presented by way of illustrative example only, and alternative stacked structures with other arrangements of components can be used in other embodiments.

For example, in some embodiments, ultrasonic waves from a first image can be transmitted from a front-side ultrasonic transducer array and then reflected back from a back-side component to be received and stored by the front-side ultrasonic transducer array. A first set of received signals, illustratively corresponding to the Fourier transform of the first image, can then be stored in the analog domain using a first set of storage capacitors to store received signal values for each pixel. A second image is then similarly transmitted from the front-side ultrasonic transducer array and then reflected back from the back-side component, with a second set of received signals, illustratively corresponding to the Fourier transform of the second image, being stored in the analog domain using a second set of storage capacitors to store received signal values for each pixel. The two Fourier transforms are then multiplied in the analog domain as previously described and the resulting product is then transmitted through the medium and received by the front-side ultrasonic transducer array. In such an embodiment, the opposite side of the device corresponding to the back-side component may comprise one or more layers with varying ultrasonic impedance elements for lensing of the received ultrasonic signals.

These and numerous other variants of ultrasonic computation engines can be implemented in accordance with the present disclosure. For example, some embodiments disclosed herein can incorporate components, materials, parameters or other aspects of one or more of the ultrasonic devices disclosed in U.S. patent application Ser. No. 17/057,868, entitled "Ultrasonic Fourier Transform Analog Computing Apparatus, Method and Applications," which is commonly assigned herewith and incorporated by reference herein in its entirety.

As indicated previously, the intermediate computational structure of a given ultrasonic computation engine illustratively comprises intermediate multiplication circuitry including a plurality of multiplier circuits, a plurality of in-phase and quadrature-phase mixer and converter circuits coupled to corresponding outputs of the multiplier circuits, and a plurality of product transmission circuits coupled to corresponding outputs of the mixer and converter circuits, arranged to facilitate the performance of the computations mentioned above. Examples of such circuitry will now be described with reference to FIGS. 6 through 10, although as noted above, additional or alternative circuitry can be incorporated into the intermediate computational structure in order to perform other types of computations.

Figure 6:
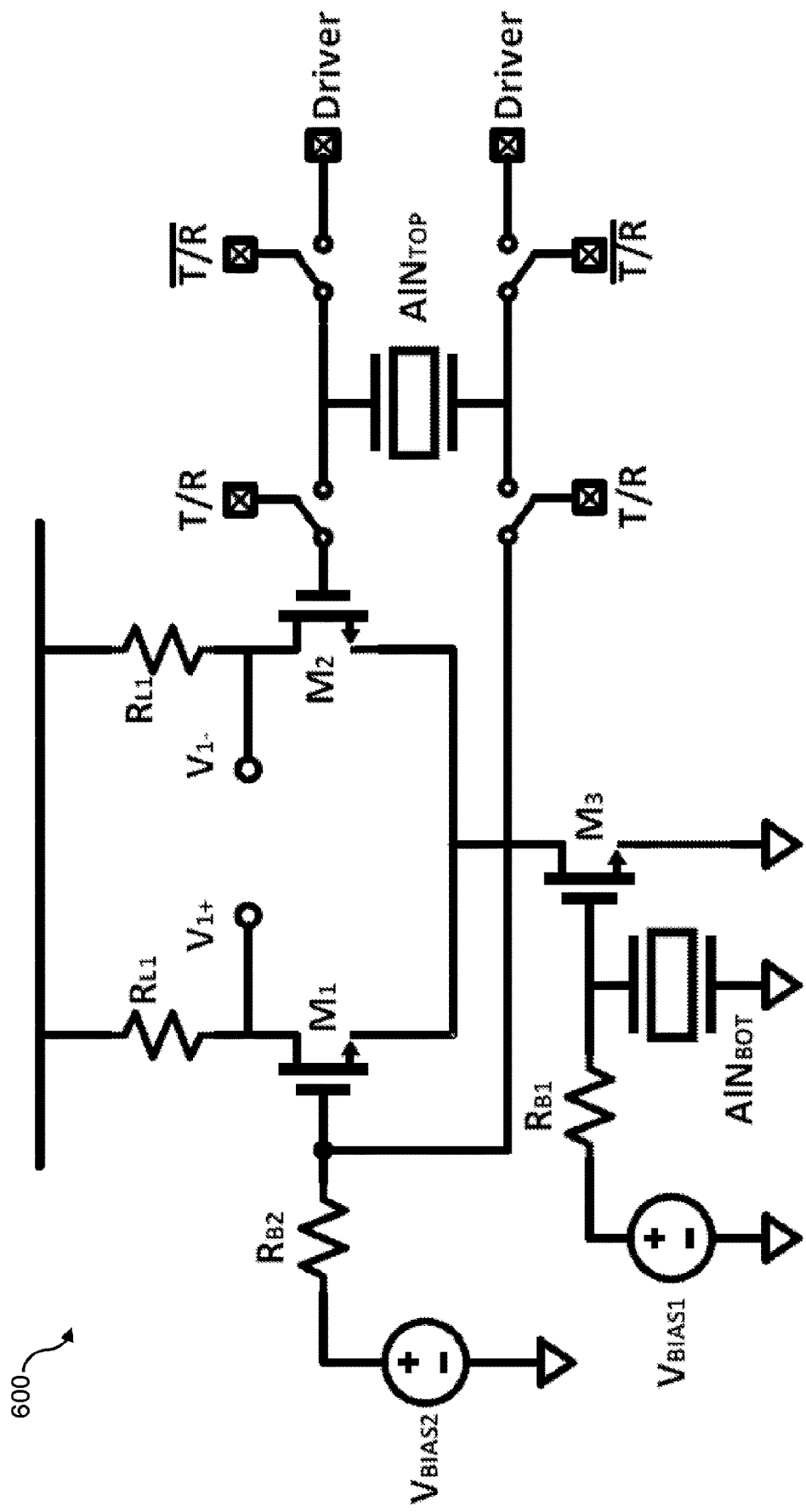
FIG. 6 is a schematic diagram of a multiplier circuit implemented in an ultrasonic computation engine in an illustrative embodiment.

FIG. 6 shows an example multiplier circuit 600 implemented to perform multiplications at a pixel level in an ultrasonic computation engine in an illustrative embodiment. The multiplier circuit 600 includes transistors $M_1$, $M_2$ and $M_3$, resistors $R_{B1}$ and $R_{B2}$, two instances of resistor $R_{L1}$, and first and second bias voltage sources $V_{BIAS1}$ and $V_{BIAS2}$, arranged as shown. Ultrasonic transducer components corresponding to respective top and bottom AlN receiver layers are denoted $AlN_{Top}$ and $AlN_{Bot}$.

Figure 9:
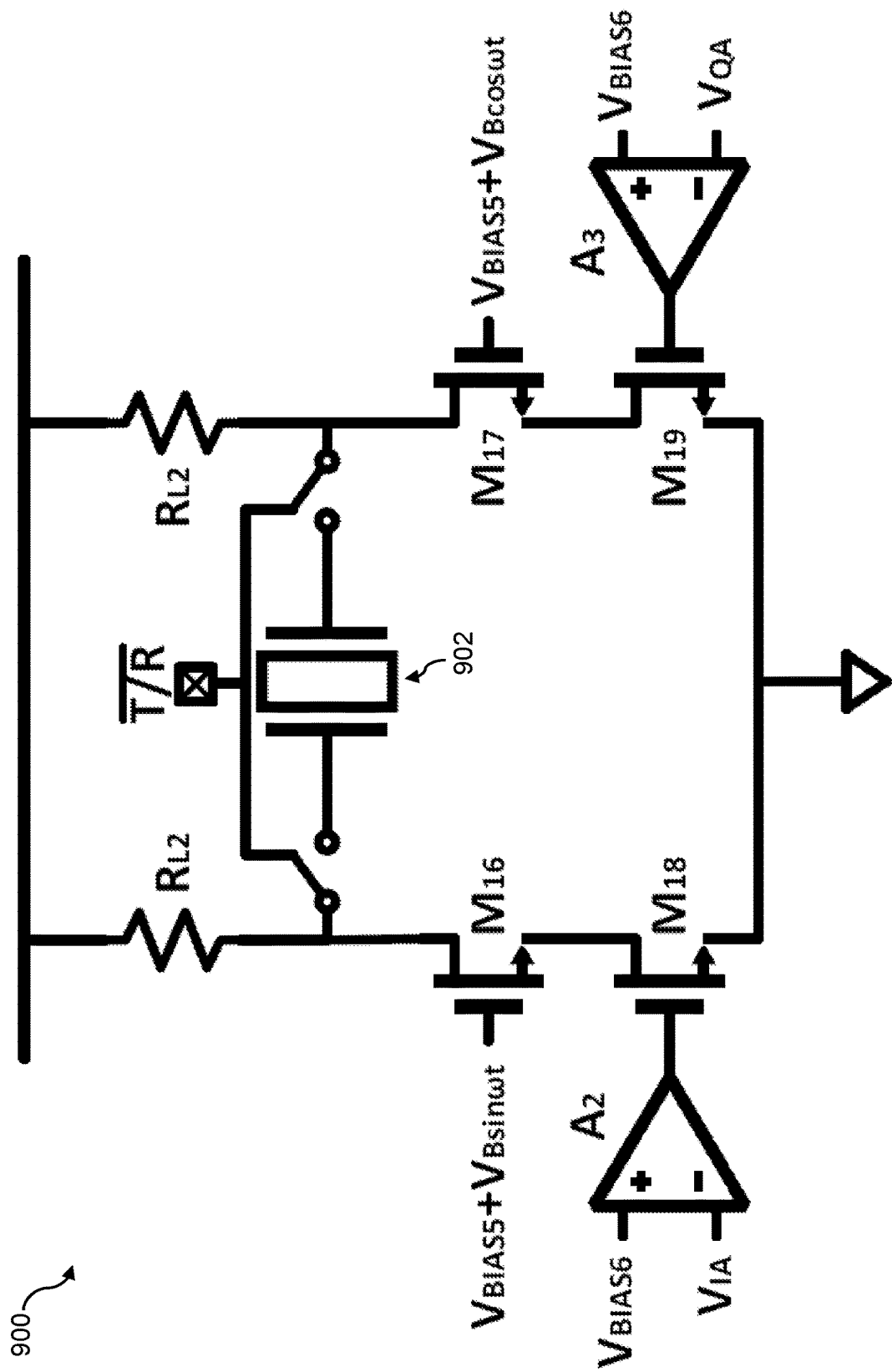
FIG. 9 is a schematic diagram of a product transmission circuit implemented in an ultrasonic computation engine in an illustrative embodiment.

A received input signal from pixel transducer $AlN_{Top}$ of the top AlN receiver layer is denoted $V_{AlN_{Top}}$ and is gated through two transmit/receive switches driven by the control signal T/R. If the control signal T/R is "on" (e.g., at a logic high level), its corresponding switches are closed, and the multiplier circuit 600 operates in a mode in which the received input signal $V_{AlN_{Top}}$ is applied to the multiplier portion of the multiplier circuit 600 to generate a product of that signal and a received input signal $V_{AlN_{Bot}}$ from the pixel transducer $Al_{NBot}$ of the bottom AlN receiver layer. If T/R is "off" (e.g., at a logic low level), its corresponding switches are open, and the switches driven by the complementary control signal $\overline{T/R}$ are closed, such that the multiplier circuit 600 operates in a mode in which an output signal from the driver circuitry of FIG. 9 is applied to transducer $AlN_{Top}$ to drive the product out through the top ultrasonic propagation region to obtain the inverse Fourier transform.

In the multiplier circuit 600, the voltages of the applied signal $V_{AlN_{Top}}$ modulate the current through transistors $M_1$ and $M_2$ differentially to generate a differential output across the terminals $V_{1+}$ and $V_{1-}$. A current tail transistor $M_3$ is driven by bias voltage source $V_{BIAS1}$ and the signal $V_{AlN_{Bot}}$ from the transducer $AlN_{Bot}$ of the bottom AlN receiver layer. The output impedance of the bias voltage source $V_{BIAS1}$ can be high such that the capacitive output of the AlN receiver layer directly effects the voltage at the $M_3$ gate. Alternatively, another differential amplifier can be used to drive the gate of $M_3$, with the differential amplifier being driven by the AlN receiver layer signal and a DC bias.

The current control in the current tail transistor $M_3$ and the differential $M_1/M_2$ control generate the product of the input voltages as the output is proportional to the transconductance $g_m$ which is controlled by the tail current. Other embodiments can utilize alternative multiplier circuits such as, for example, quadrant multipliers, balanced multipliers or other types of multipliers, as will be appreciated by those skilled in the art.

Figure 7:
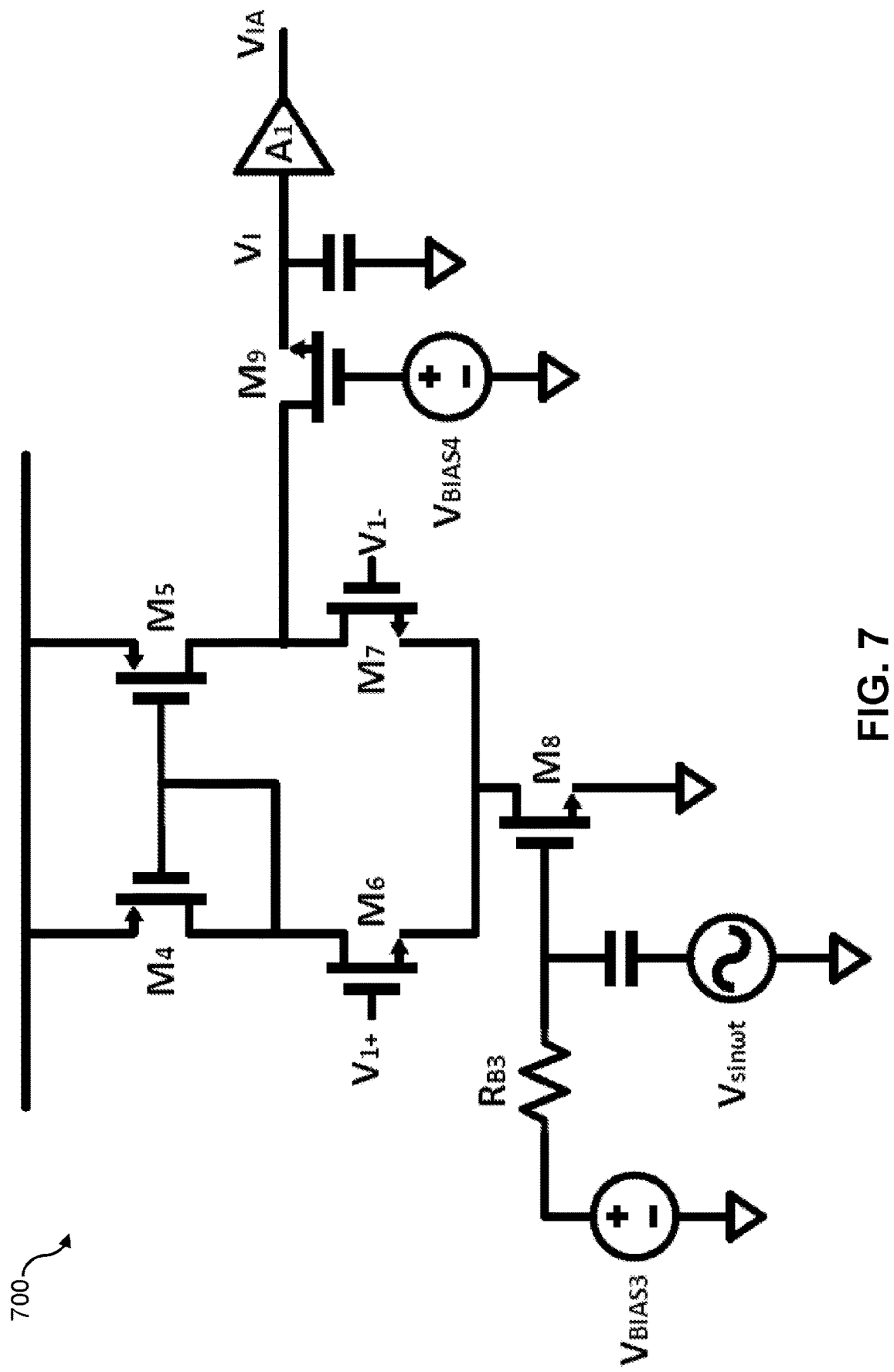
FIGS. 7 and 8 are schematic diagrams of respective in-phase (I) and quadrature-phase (Q) implementations of mixer and DC converter circuits for converting output of the multiplier circuit of FIG. 6 to respective I and Q components.
Figure 8:
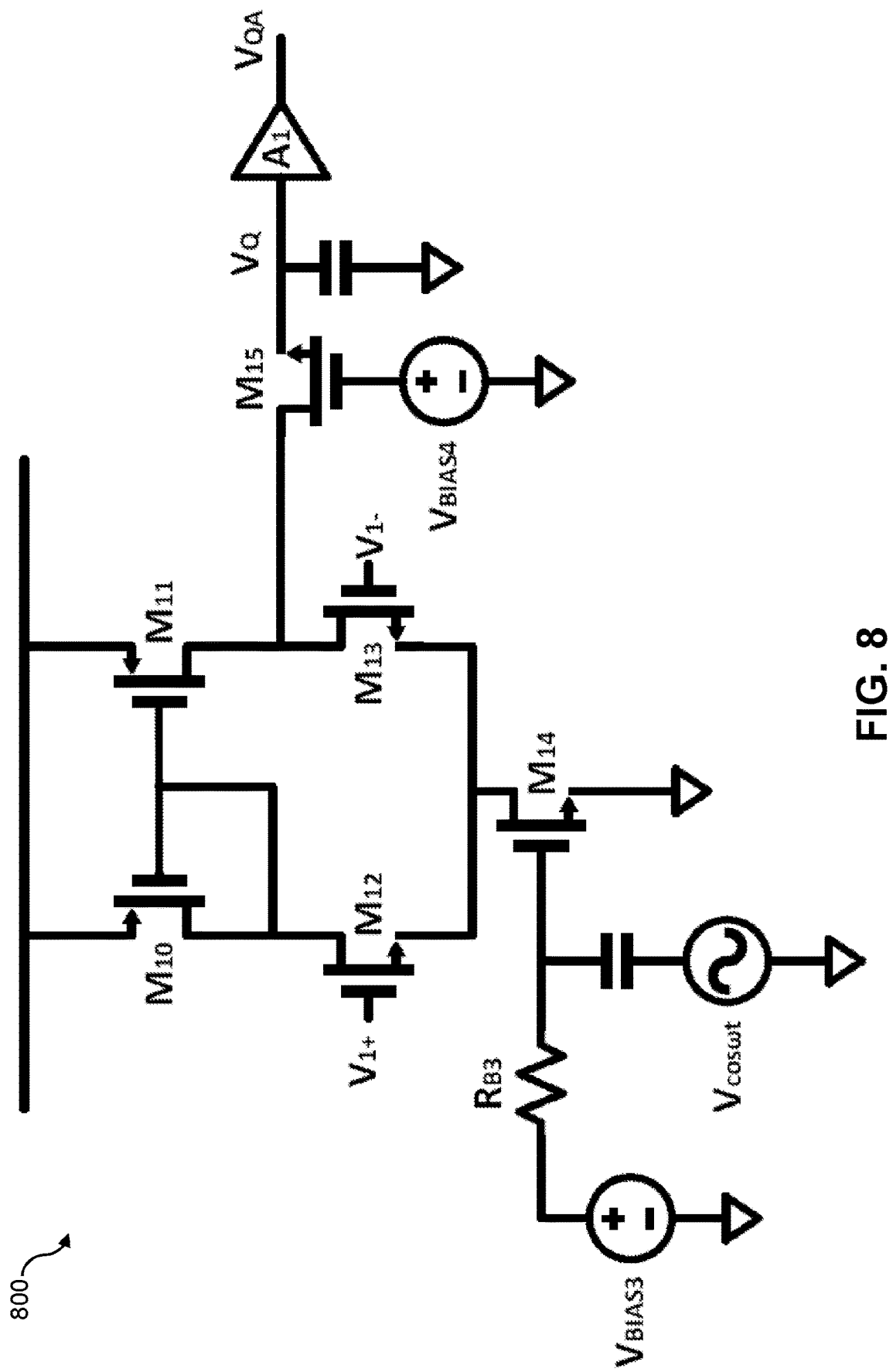

FIGS. 7 and 8 show respective example in-phase (I) and quadrature-phase (Q) implementations of mixer and DC converter circuits 700 and 800 for converting an output of the multiplier circuit 600 of FIG. 6 to respective I and Q components. The mixer and DC converter circuit 700 of FIG. 7 includes transistors $M_4$ through $M_9$, resistor $R_{B3}$, first and second capacitors, amplifier $A_1$, bias voltage sources $V_{BIAS3}$ and $V_{BIAS4}$, and a signal source $V_{sin \omega t}$, arranged as shown. The mixer and DC converter circuit 800 of FIG. 8 is configured in a similar manner, but with transistors Mio through $M_{15}$, and a signal source $V_{cos \omega t}$.

In FIG. 7, a $sin(\omega t)$ component from signal source $V_{sin \omega t}$ is multiplied with the input voltage from the multiplier circuit 600 and then rectified using transistor $M_9$ and averaged using the output capacitor, and then amplified using amplifier $A_1$ to produce the output in-phase or I component $V_{IA}$.

Similarly, in FIG. 8, a $cos(\omega t)$ component from signal source $V_{cos \omega t}$ is multiplied with the input voltage from the multiplier circuit 600 and then rectified using transistor $M_{15}$ and averaged using the output capacitor, and then amplified using amplifier $A_1$ to produce the output quadrature-phase or Q component $V_{QA}$. The circuits 700 and 800 therefore generate I and Q components of the product from the multiplier circuit 600.

Once the I and Q components of the product are generated, and the initial ultrasonic energy from propagation of the input image and kernel image through the respective upper and lower ultrasonic propagation regions is absorbed in the absorber layers, the product is transmitted through one of the upper and lower ultrasonic propagation regions to obtain the inverse Fourier transform as previously described.

FIG. 9 shows an example product transmission circuit 900 implemented in an ultrasonic computation engine in an illustrative embodiment. The product transmission circuit 900 includes transistors $M_{16}$ through $M_{19}$, two instances of resistor $R_{L2}$, and amplifiers $A_2$ and $A_3$, arranged as shown, and utilizes bias signals $V_{BIAS5}$ and $V_{BIAS6}$. The amplifiers $A_2$ and $A_3$ receive at inverting inputs thereof the signals $V_{IA}$ and $V_{QA}$ from the respective circuits 700 and 800 of FIGS. 7 and 8. The amplifiers $A_2$ and $A_3$ receive at non-inverting inputs thereof the bias signal $V_{BIAS6}$.

The product transmission circuit 900 drives a transducer 902 for transmitting the product signal. This transducer illustratively corresponds to the above-noted transducer $AlN_{Top}$. The transducer 902 is connected across the output of two common-source amplifiers comprising respective transistors $M_{16}$ and $M_{17}$ such that the difference of the I and Q input signal voltages appears across the transducer 902. For example, if the input on the left side is given by $V_{PI} sin(\omega t)$, and the input on the right side is given by $-V_{PQ} cos(\omega t)$, then the voltage across the transducer 902 is given by $V_{PI} sin(\omega t) + V_{PQ} cos(\omega t)$. This phase shifts the output to generate via the transducer 902 a corresponding acoustic wave with the phase and amplitude information. Transistors $M_{18}$ and $M_{19}$ control the amplitude of the two components and their polarity can be reversed using a variety of circuits that effectively subtract and level shift, as will be appreciated by those skilled in the art.

Figure 10:
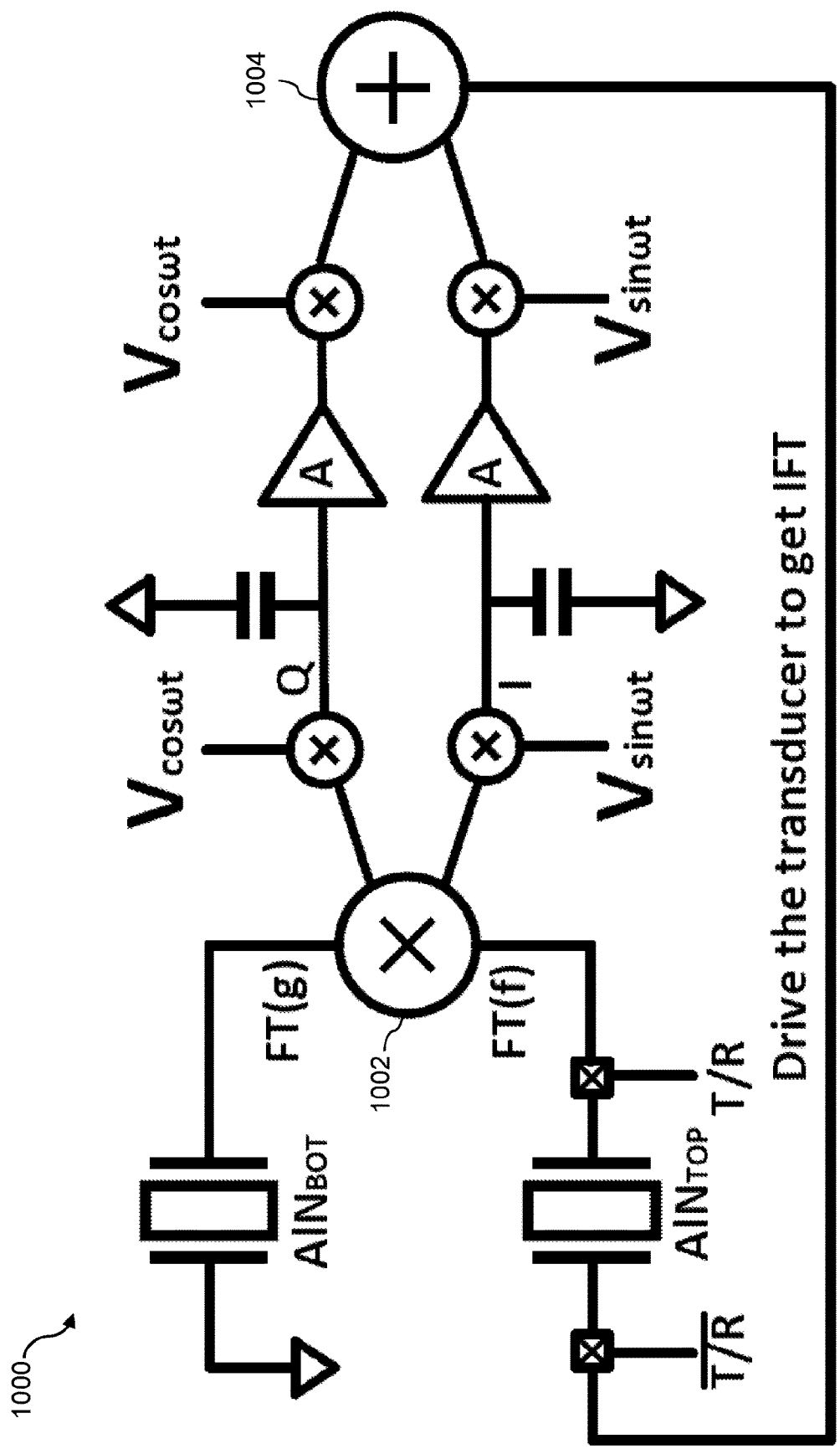
FIG. 10 is a schematic diagram showing an example of intermediate multiplication circuitry that incorporates a multiplier circuit, I and Q mixer and DC converter circuits, and a product transmission circuit, all implemented in an ultrasonic computation engine in an illustrative embodiment.

FIG. 10 shows example intermediate multiplication circuitry 1000 that incorporates a multiplier circuit such as multiplier circuit 600, I and Q mixer and DC converter circuits such as circuits 700 and 800, and a product transmission circuit such as circuit 900, all implemented in an ultrasonic computation engine in an illustrative embodiment. The intermediate multiplication circuitry 1000 generally operates in a manner similar to that previously described in conjunction with the circuits 600, 700, 800 and 900 of FIGS. 6 through 9. This circuitry is part of what is generally referred to herein as an intermediate computational structure of an ultrasonic computation engine.

In the circuitry 1000, received input signals denoted FT(f) and FT(g) from the respective top and bottom AlN receiver layer pixel transducers $AlN_{Top}$ and $AlN_{Bot}$ are multiplied in multiplier 1002, and the I and Q components of the product are extracted, and then stored on two capacitors. The stored components are amplified in respective amplifiers, each denoted A, and then mixed again with sin and cos terms and summed in signal combiner 1004 to provide the product that is transmitted via the transducer $AlN_{Top}$ in ultrasonic waves through the top ultrasonic propagation region to obtain the inverse Fourier transform.

As indicated previously, in other embodiments, the circuitry can be configured such that the product is transmitted via the transducer $AlN_{Bot}$ in ultrasonic waves through the bottom propagation region to obtain the inverse Fourier transform. Numerous other circuitry arrangements are possible in other embodiments.

Ultrasonic computation engines of the type described above can be implemented in a processing platform that integrates such components with a CNN, DNN or other type of machine learning system to provide significant improvements in computational efficiency and associated classification performance.

Figure 11:
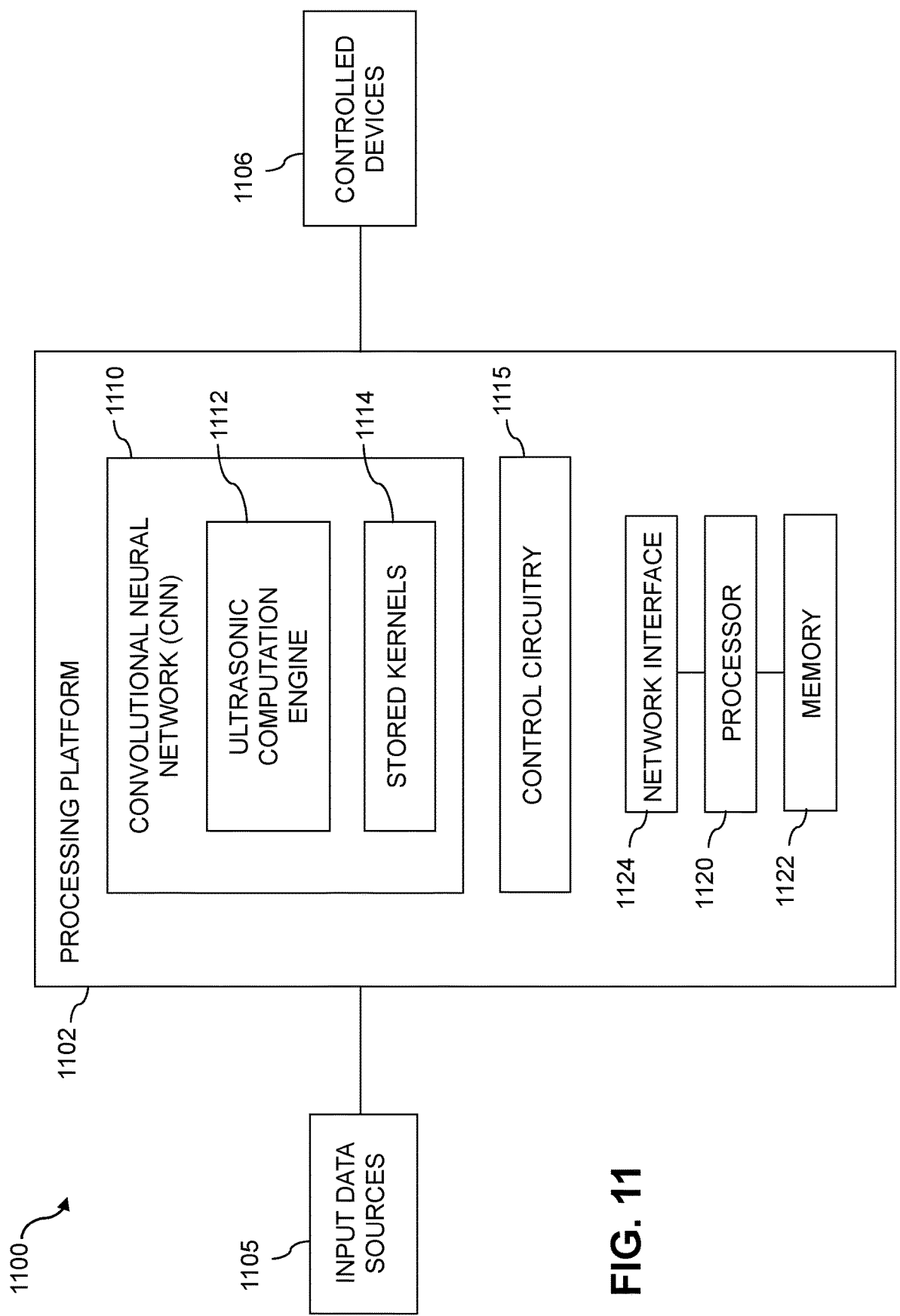
FIG. 11 is a block diagram of an information processing system that incorporates a neural network having as a component thereof an ultrasonic computation engine in an illustrative embodiment.

FIG. 11 shows an example of an information processing system 1100 that incorporates a processing platform 1102. The processing platform 1102 illustratively interacts with input data sources 1105 and controlled devices 1106. The processing platform 1102 comprises a CNN 1110 that includes an ultrasonic computation engine 1112 and a plurality of stored kernels 1114. Also included in the processing platform 1102 is control circuitry 1115, which illustratively utilizes classification outputs of the CNN 1110 to control one or more of the controlled devices 1106. The processing platform 1102 in some embodiments may be part of a larger device, such as a car, drone or robot, each of which may be considered an "information processing system" as that term is broadly used herein. The processing platform 1102 further comprises a processor 1120, a memory 1122 and a network interface 1124.

The processing platform 1102 in this embodiment implements a computing architecture that utilizes ultrasonic computation engine 1112 to improve the computational efficiency of the CNN 1110. Although shown as a component of the CNN 1110 in this embodiment, the ultrasonic computation engine 1112 can in other embodiments be implemented at least in part externally to the CNN 1110. Also, there may be multiple ultrasonic computation engines, rather than a single ultrasonic computation engine as illustrated.

The CNN 1110 illustratively processes input images which may be received from one or more of the input data sources 1105. Additionally or alternatively, input images may be generated from a pixel array or other image sensor array integrated with the ultrasonic computation engine in the manner described elsewhere herein. The processing of these and other input images in CNN 1110 illustratively includes various types of image classification operations which classify a particular received image as being an image of a particular type of object or arrangement of multiple objects. In performing such operations, the CNN 1110 applies an input image and a particular kernel image from the stored kernels 1114 to the ultrasonic computation engine 1112 to generate a convolution of the input image and the kernel image in the manner previously described herein. The CNN 1110 similarly utilizes the ultrasonic computation engine 1112 to generate a plurality of convolutions of the input image with respective different ones of a plurality of kernel images from the stored kernels 1114 as respective ones of a plurality of convolution operations of the CNN 1110.

The processor 1120 may comprise, for example, a microprocessor, an application-specific integrated circuit (ASIC), a field-programmable gate array (FPGA), a central processing unit (CPU), a tensor processing unit (TPU), a graphics processing unit (GPU), an arithmetic logic unit (ALU), a digital signal processor (DSP), or other similar processing device component, as well as other types and arrangements of processing circuitry, in any combination. At least a portion of the functionality of a computing architecture provided by one or more processing devices as disclosed herein can be implemented using such circuitry.

In some embodiments, the processor 1120 comprises one or more graphics processor integrated circuits of the processing platform 1102. Such graphics processor integrated circuits are illustratively implemented in the form of one or more GPUs. Accordingly, in some embodiments, an information processing system implementing a CNN or other type of machine learning system is configured to include a GPU-based processing platform. Such a GPU-based processing platform can be cloud-based and configured to implement a CNN or other type of machine learning system as disclosed herein. Other embodiments can be implemented using similar arrangements of one or more TPUs.

Numerous other arrangements are possible. For example, in some embodiments, one or more computing architectures and associated neural networks can be implemented on a single device, such as a car, drone or robot, utilizing one or more processors and one or more ultrasonic computation engines of that device. Such embodiments are examples of "on-device" implementations of computing architectures.

The memory 1122 stores software program code for execution by the processor 1120 in implementing portions of the functionality of the processing platform 1102. For example, at least portions of the functionality of a computing architecture or other machine learning system component can be implemented using program code stored in memory.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, flash memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, illustrative embodiments may be implemented in the form of integrated circuits comprising processing circuitry configured to implement processing operations associated with a computing architecture or its associated machine learning system. For example, at least a portion of a computing architecture as disclosed herein is illustratively implemented in at least one neural network integrated circuit of a processing device of the processing platform. Such a neural network integrated circuit can be at least partially integrated with one or more ultrasonic computation engines as disclosed herein.

The network interface 1124 is configured to allow the processing platform 1102 to communicate over one or more networks with other system elements, and may comprise one or more conventional transceivers.

Figure 12:
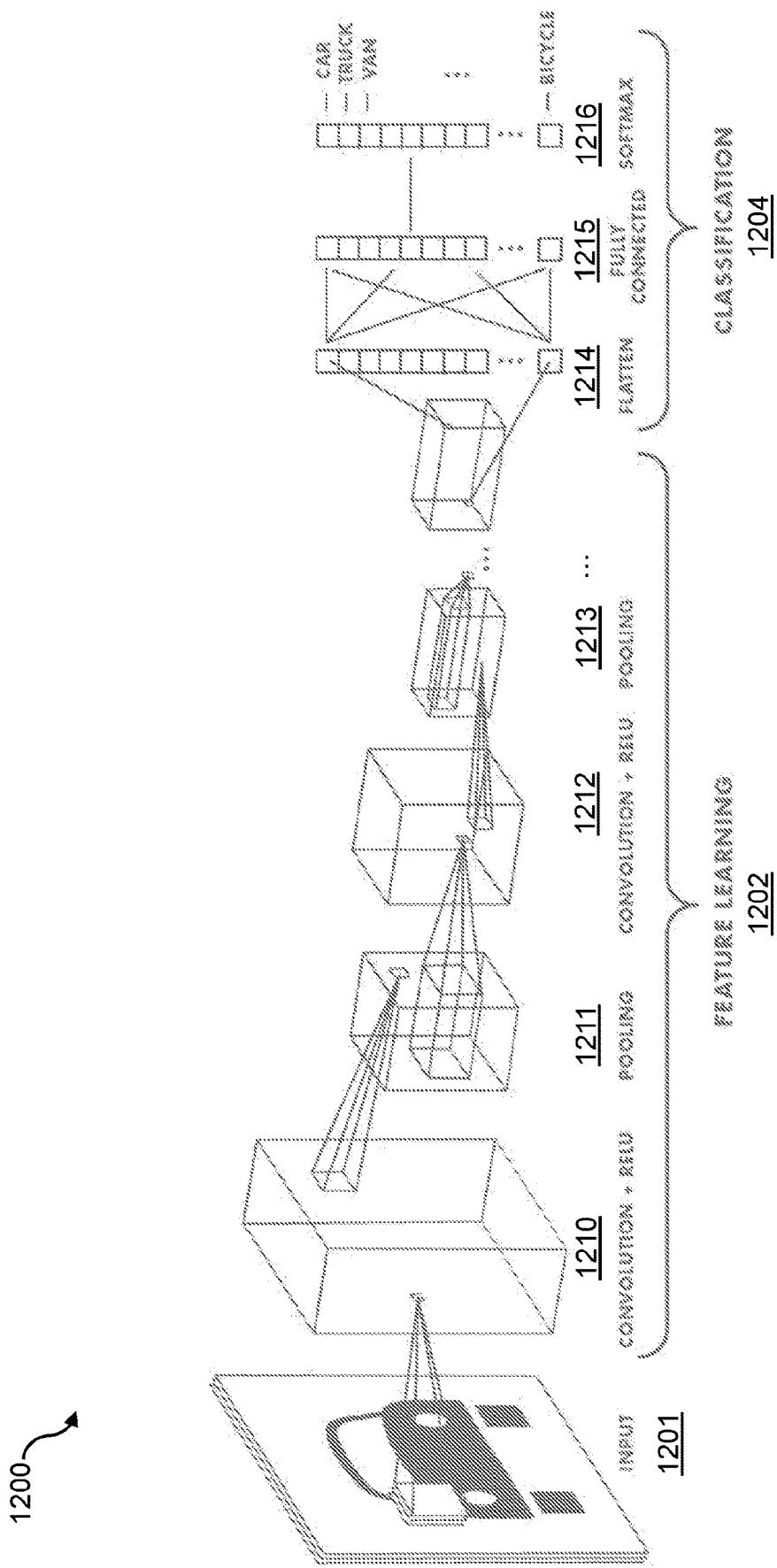
FIG. 12 shows a more detailed view of an example implementation of the neural network of FIG. 11 that has as a component thereof an ultrasonic computation engine in an illustrative embodiment.

FIG. 12 shows a more detailed view of an example implementation 1200 of the CNN 1110 of FIG. 11. It is assumed that the CNN 1110 comprises or is otherwise associated with at least one ultrasonic computation engine 1112 that is configured to perform high-efficiency convolution operations for the CNN 1110 in conjunction with feature learning and associated image classification.

In the example implementation 1200, the CNN 1110 receives input 1201, illustratively a series of input images, and performs feature learning 1202 followed by classification 1204. In feature learning 1202, the CNN 1110 includes a first convolution plus rectified linear unit (ReLU) layer 1210 followed by a first pooling layer 1211, and a second convolution plus ReLU layer 1212 followed by a second pooling layer 1213, and may include one or more additional layers of similar type, as indicated in the figure. In classification 1204, the CNN 1110 includes a flatten layer 1214, a fully-connected layer 1215, and a softmax layer 1216. The CNN 1110 in this embodiment is more particularly configured to learn features of input images by performing convolutions with kernel images, and then to utilize those learned features to perform image classification. For example, as illustrated in the figure, the CNN 1110 can learn features of various types of vehicles, so as to be able to classify additional images as each corresponding to a particular type of vehicle, such as a car, truck, van, bicycle, etc.

It is to be appreciated that the particular arrangement of components and other system elements described above is presented by way of illustrative example only, and numerous alternative embodiments are possible. For example, other embodiments of information processing systems can be configured to implement computing architectures and associated machine learning functionality of the type disclosed herein.

In other embodiments, different types of neural networks can be used. For example, although some embodiments are implemented using CNNs, other embodiments can comprise additional or alternative neural networks, such as DNNs configured for deep learning, or other types of neural networks implementing other types of machine learning or artificial intelligence algorithms.

Also, the particular process operations described in illustrative embodiments herein, although illustrated as being performed sequentially, can in other embodiments be performed at least in part in parallel with one another, or in different orders. Also, additional or alternative processing operations can be used in other embodiments.

As indicated previously, embodiments disclosed herein provide significant advantages over conventional approaches.

These and other advantages referred to herein are illustratively present in some embodiments, but need not be present in all embodiments. Other embodiments can provide different arrangements of advantages, depending upon their particular implementations.

The particular configurations as shown in the figures are non-limiting and should be considered illustrative examples only. Numerous other types of ultrasonic computation engines and associated computing architectures can be used in other embodiments. Also, other types of machine learning and/or artificial intelligence arrangements, illustratively implementing other types of neural networks, can be used in other embodiments. Accordingly, illustrative embodiments herein are not limited to use with particular ultrasonic computation engine implementations, or to use with CNNs, DNNs or other particular types of neural networks or machine learning systems.

An information processing system comprising one or more ultrasonic computation engines as disclosed herein can be configured to support a wide variety of distinct applications, in numerous diverse contexts.

It is therefore to be appreciated that the particular use cases described herein are examples only, intended to demonstrate utility of illustrative embodiments, and should not be viewed as limiting in any way.

Automated actions taken based on outputs generated by a machine learning system of the type disclosed herein can include particular actions involving interaction between a processing platform and other related equipment utilized in one or more of the use cases described herein. For example, control signals or other outputs generated by a machine learning system can control one or more components of a related system. In some embodiments, the machine learning system and the components in the related system are implemented on the same processing platform, which may comprise, for example, a car, a drone, a robot or another type of system or device, and in other embodiments the machine learning system and the components of the related system are implemented on separate processing platforms, illustratively interconnected by one or more networks.

As indicated above, the particular arrangements shown and described in conjunction with the figures are presented by way of illustrative example only, and numerous alternative embodiments are possible. The various embodiments disclosed herein should therefore not be construed as limiting in any way. Numerous alternative arrangements of computing architectures comprising one or more ultrasonic computation engines can be utilized in other embodiments. Those skilled in the art will also recognize that alternative processing operations and associated system configurations can be used in other embodiments.

It is therefore possible that other embodiments may include additional or alternative system elements, relative to the entities of the illustrative embodiments. Accordingly, the particular system configurations and associated computation implementations can be varied in other embodiments.

A given processing device or other component of an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, a TPU, a GPU, an ALU, a DSP, or other similar processing device component, as well as other types and arrangements of processing circuitry, in any combination. For example, at least a portion of the functionality of a computing architecture and/or an associated machine learning system provided by one or more processing devices as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, ROM, flash memory, magnetic memory, optical memory, or other types of storage devices in any combination.

As mentioned previously, articles of manufacture comprising such processor-readable storage media are considered embodiments of the invention. The term "article of manufacture" as used herein should be understood to exclude transitory, propagating signals. Other types of computer program products comprising processor-readable storage media can be implemented in other embodiments.

In addition, embodiments of the invention may be implemented in the form of integrated circuits comprising processing circuitry configured to implement processing operations associated with implementation of a computing architecture and/or associated machine learning system as disclosed.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory. A given such network can illustratively include, for example, a global computer network such as the Internet, a WAN, a LAN, a satellite network, a telephone or cable network, a cellular network such as a 4G or 5G network, a wireless network implemented using a wireless protocol such as Bluetooth, WiFi or WiMAX, or various portions or combinations of these and other types of communication networks.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

A given processing platform implementing a computing architecture comprising at least one ultrasonic computation engine as disclosed herein can be implemented or otherwise supported by cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

It should again be emphasized that the embodiments of the invention as described herein are intended to be illustrative only. Other embodiments of the invention can be implemented utilizing a wide variety of different types and arrangements of ultrasonic computation engines, computing architectures, information processing systems, processing devices, machine learning systems and additional or alternative components, than those utilized in the particular illustrative embodiments described herein, and in numerous alternative processing contexts. In addition, the particular assumptions made herein in the context of describing certain embodiments need not apply in other embodiments. These and numerous other alternative embodiments will be readily apparent to those skilled in the art.

What is claimed is:

1. An ultrasonic computation apparatus comprising:
    first and second ultrasonic transducer arrays arranged on opposing ends of the ultrasonic computation apparatus;
    first and second ultrasonic propagation regions arranged between the first and second ultrasonic transducer arrays and proximate respective ones of the first and second ultrasonic transducer arrays; and
    an intermediate computational structure arranged between the first and second ultrasonic propagation regions;
    wherein respective first and second signals applied to respective ones of the first and second ultrasonic transducer arrays cause propagation of corresponding ultrasonic waves through the respective first and second ultrasonic propagation regions towards the intermediate computational structure; and
    wherein the intermediate computational structure is configured to receive the propagating ultrasonic waves from the respective first and second ultrasonic propagation regions and to generate from the received propagating ultrasonic waves an additional signal that is a function of the first and second signals.

2. The apparatus of claim 1 wherein the intermediate computational structure is configured to generate the additional signal at least in part as a product of transformed versions of the respective first and second signals as represented by the corresponding received propagating ultrasonic waves.

3. The apparatus of claim 1 wherein the first ultrasonic transducer array and the first ultrasonic propagation region are configured such that the propagation of ultrasonic waves corresponding to the first signal through the first ultrasonic propagation region causes a Fourier transform of the first signal to be received at a first side of the intermediate computational structure proximate the first ultrasonic propagation region.

4. The apparatus of claim 3 wherein the second ultrasonic transducer array and the second ultrasonic propagation region are configured such that the propagation of ultrasonic waves corresponding to the second signal through the second ultrasonic propagation region causes a Fourier transform of the second signal to be received at a second side of the intermediate computational structure proximate the second ultrasonic propagation region.

5. The apparatus of claim 4 wherein the intermediate computational structure is configured to generate the additional signal as a product of the Fourier transforms of the respective first and second signals.

6. The apparatus of claim 1 wherein the generation of the additional signal in the intermediate computational structure causes propagation of additional ultrasonic waves through one of the first and second ultrasonic propagation regions towards one of the first and second ultrasonic transducer arrays such that a function of the additional signal is received at said one of the first and second ultrasonic transducer arrays.

7. The apparatus of claim 6 wherein the additional signal generated in the intermediate computational structure comprises a product of Fourier transforms of respective ones of the first and second signals and the function of the additional signal received at said one of the first and second ultrasonic transducer arrays comprises an inverse Fourier transform of the product of the Fourier transforms, the inverse Fourier transform of the product of the Fourier transforms being a convolution of the first and second signals.

8. The apparatus of claim 1 wherein the first signal comprises an input image applied to the first ultrasonic transducer array and the second signal comprises a kernel image applied to the second ultrasonic transducer array.

9. The apparatus of claim 8 wherein the kernel image is one of a plurality of kernel images of a convolutional neural network and the apparatus is configured to generate a plurality of convolutions of the input image with respective ones of the kernel images as respective convolution operations of the convolutional neural network.

10. The apparatus of claim 1 wherein at least one of the first and second ultrasonic transducer arrays comprises a transmit/receive ultrasonic transducer array that is configured to transmit ultrasonic waves to its corresponding ultrasonic propagation region and to receive ultrasonic waves from its corresponding ultrasonic propagation region.

11. The apparatus of claim 1 wherein at least one of the first and second ultrasonic transducer arrays is adapted to receive a corresponding one of the first and second signals via an image sensor array that is coupled to the ultrasonic transducer array and is configured to generate the corresponding one of the first and second signals as an image signal that is applied from the image sensor array to the ultrasonic transducer array.

12. The apparatus of claim 1 wherein at least one of the ultrasonic propagation regions comprises:
- a first sub-region adjacent its corresponding one of the first and second ultrasonic transducer arrays;
- a second sub-region adjacent the intermediate computational structure; and
- at least one lens arranged between the first and second sub-regions.

13. The apparatus of claim 1 wherein the intermediate computational structure comprises intermediate multiplication circuitry comprising:
- a plurality of multiplier circuits;
- a plurality of in-phase and quadrature-phase mixer and converter circuits coupled to corresponding outputs of the multiplier circuits; and
- a plurality of product transmission circuits coupled to corresponding outputs of the mixer and converter circuits.

14. The apparatus of claim 1 wherein the intermediate computational structure comprises:
- first and second receiver layers arranged proximate respective ones of the first and second ultrasonic propagation regions; and
- an interposer layer arranged between the first and second receiver layers;
- wherein a plurality of vias are configured to connect the first and second receiver layers through the interposer layer.

15. An apparatus comprising:
- at least one processing device comprising a processor coupled to a memory; and
- one or more ultrasonic computation engines each coupled to the at least one processing device;
- the at least one processing device being configured to implement a machine learning system;
- the one or more ultrasonic computation engines each being configured to perform computations for the machine learning system;
- wherein each of the one or more ultrasonic computation engines comprises:
- first and second ultrasonic transducer arrays arranged on opposing ends of the ultrasonic computation engine and adapted to receive respective first and second signals;
- first and second ultrasonic propagation regions arranged between the first and second ultrasonic transducer arrays and proximate respective ones of the first and second ultrasonic transducer arrays; and
- an intermediate computational structure arranged between the first and second ultrasonic propagation regions;
- wherein the intermediate computational structure is configured to perform at least a portion of the computations for the machine learning system, including generating an additional signal that is a function of the first and second signals.

16. The apparatus of claim 15 wherein the machine learning system comprises a convolutional neural network and one or more of the computations each comprise a convolution operation of the convolutional neural network.

17. The apparatus of claim 16 wherein the first signal comprises an input image applied to the first ultrasonic transducer array and the second signal comprises a kernel image applied to the second ultrasonic transducer array.

18. The apparatus of claim 17 wherein the kernel image is one of a plurality of kernel images of the convolutional neural network and a given one of the one or more ultrasonic computation engines is configured to generate a plurality of convolutions of the input image with respective different ones of the kernel images as respective ones of a plurality of convolution operations of the convolutional neural network.

19. A method comprising:
- applying first and second signals to respective first and second ultrasonic transducer arrays arranged on opposing ends of an ultrasonic computation engine, the ultrasonic computation engine further comprising first and second ultrasonic propagation regions arranged between the first and second ultrasonic transducer arrays and proximate respective ones of the first and second ultrasonic transducer arrays, and an intermediate computational structure arranged between the first and second ultrasonic propagation regions;
- propagating ultrasonic waves corresponding to respective ones of the first and second signals from respective ones of the first and second ultrasonic transducer arrays through the respective first and second ultrasonic propagation regions towards the intermediate computational structure;
- receiving in the intermediate computational structure the propagating ultrasonic waves from the respective first and second ultrasonic propagation regions; and
- generating in the intermediate computational structure, based at least in part on the received propagating ultrasonic waves, an additional signal that is a function of the first and second signals.

20. The method of claim 19 wherein generating the additional signal in the intermediate computational structure comprises generating the additional signal at least in part as a product of transformed versions of the respective first and second signals as represented by the corresponding received propagating ultrasonic waves.

* * * * *